US012515985B2

(12) United States Patent
Ueno et al.

(10) Patent No.: US 12,515,985 B2
(45) Date of Patent: Jan. 6, 2026

(54) CEMENT CLINKER PRODUCTION SYSTEM AND CEMENT CLINKER PRODUCTION METHOD

(71) Applicant: TAIHEIYO CEMENT CORPORATION, Tokyo (JP)

(72) Inventors: Naoki Ueno, Tokyo (JP); Koji Nomura, Tokyo (JP); Kenichi Honma, Tokyo (JP); Junichi Terasaki, Tokyo (JP); Tomohisa Yoshikawa, Tokyo (JP); Takayuki Kimura, Tokyo (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 290 days.

(21) Appl. No.: 18/246,925

(22) PCT Filed: Sep. 29, 2021

(86) PCT No.: PCT/JP2021/035940
§ 371 (c)(1),
(2) Date: Mar. 28, 2023

(87) PCT Pub. No.: WO2022/130730
PCT Pub. Date: Jun. 23, 2022

(65) Prior Publication Data
US 2023/0365464 A1    Nov. 16, 2023

(30) Foreign Application Priority Data

Dec. 17, 2020  (JP) .................. 2020-208955
Mar. 23, 2021  (JP) .................. 2021-048117
Mar. 24, 2021  (JP) .................. 2021-049868

(51) Int. Cl.
*C04B 7/36*  (2006.01)
*B01D 53/62*  (2006.01)
(Continued)

(52) U.S. Cl.
CPC .............. *C04B 7/367* (2013.01); *B01D 53/62* (2013.01); *B01D 53/81* (2013.01); *C04B 7/364* (2013.01);
(Continued)

(58) Field of Classification Search
CPC ......... C04B 7/364; C04B 7/432; C04B 7/434; C04B 7/44; C04B 7/4407; C04B 7/47;
(Continued)

(56) References Cited

U.S. PATENT DOCUMENTS

| 8,617,506 B2 | 12/2013 | Shima et al. |
| 2010/0037804 A1* | 2/2010 | Paxton .................. F27B 7/2033 |
| | | 106/758 |
| 2013/0192497 A1* | 8/2013 | Terasaki .................. F27D 17/00 |
| | | 106/819 |

FOREIGN PATENT DOCUMENTS

| CN | 106679438 A * | 5/2017 | ............. F27D 17/00 |
| JP | S5959243 A | 4/1984 | |

(Continued)

OTHER PUBLICATIONS

CN-106679438-A translation (Year: 2025).*
(Continued)

*Primary Examiner* — Steven S Anderson, II
*Assistant Examiner* — Kurt Wolford
(74) *Attorney, Agent, or Firm* — Posz Law Group, PLC

(57) ABSTRACT

A cement clinker producing system, capable of providing a gas containing a carbon dioxide gas at a high concentration by increasing a carbon dioxide gas concentration for a part of an exhaust gas, includes a cyclone preheater to preheat a cement clinker raw material, a rotary kiln to burn the preheated cement clinker raw material so as to provide cement clinker, a calcination furnace to promote decarbonation of the cement clinker raw material, a clinker cooler to (Continued)

cool the cement clinker, a kiln exhaust-gas discharge passages to discharge an exhaust gas generated in the rotary kiln, a combustion-supporting gas supply device to supply a combustion-supporting gas having a higher oxygen concentration than air, a combustion-supporting gas supply passage to guide the combustion-supporting gas to the calcination furnace, and a calcination furnace exhaust-gas discharge passage to discharge a carbon dioxide gas-containing exhaust gas generated in the calcination furnace.

17 Claims, 3 Drawing Sheets

(51) Int. Cl.
- *B01D 53/81* (2006.01)
- *C04B 7/43* (2006.01)
- *C04B 7/44* (2006.01)
- *C04B 7/47* (2006.01)
- *C07C 1/12* (2006.01)
- *C25B 1/04* (2021.01)
- *F27B 7/20* (2006.01)
- *F27B 7/38* (2006.01)
- *F27D 17/17* (2025.01)
- *F27D 17/20* (2025.01)
- *F27D 17/25* (2025.01)

(52) U.S. Cl.
CPC .............. *C04B 7/432* (2013.01); *C04B 7/434* (2013.01); *C04B 7/44* (2013.01); *C04B 7/4407* (2013.01); *C04B 7/47* (2013.01); *C04B 7/475* (2013.01); *C07C 1/12* (2013.01); *C25B 1/04* (2013.01); *F27B 7/2016* (2013.01); *F27B 7/2025* (2013.01); *F27B 7/2033* (2013.01); *F27B 7/383* (2013.01); *F27D 17/17* (2025.01); *F27D 17/20* (2025.01); *F27D 17/25* (2025.01); *B01D 2251/404* (2013.01); *B01D 2257/504* (2013.01); *B01D 2258/0233* (2013.01); *F27M 2003/03* (2013.01)

(58) Field of Classification Search
CPC ......... C04B 7/475; C04B 7/367; B01D 53/62; B01D 53/81; B01D 2251/404; B01D 2257/504; B01D 2258/0233; C07C 1/12; C25B 1/04; F27B 7/2016; F27B 7/2025; F27B 7/2033; F27B 7/383; F27D 17/17; F27D 17/20; F27D 17/25; F27M 2003/03
See application file for complete search history.

(56) References Cited

FOREIGN PATENT DOCUMENTS

| | | | |
|---|---|---|---|
| JP | S61-197452 A | 9/1986 | |
| JP | H10185170 A | 7/1998 | |
| JP | H11278888 A | 10/1999 | |
| JP | 2000-239670 A | 9/2000 | |
| JP | 2001120950 A | 5/2001 | |
| JP | 2004-292298 A | 10/2004 | |
| JP | 2007-126328 A | 5/2007 | |
| JP | 2008239359 A | 10/2008 | |
| JP | 2009-529408 A | 8/2009 | |
| JP | 2010509166 A | 3/2010 | |
| JP | 2011105535 A | 6/2011 | |
| JP | 2015-30653 A | 2/2015 | |
| JP | 2015030653 A * | 2/2015 | |
| JP | 2015527286 A | 9/2015 | |
| JP | 2018-52746 A | 4/2018 | |
| JP | 2019-55903 A | 4/2019 | |
| JP | 2019172595 A | 10/2019 | |
| JP | 2019178056 A | 10/2019 | |
| WO | WO-2008059378 A2 * | 5/2008 | ............ F27B 7/362 |
| WO | 2011/162101 A | 12/2011 | |
| WO | WO-2015055349 A1 * | 4/2015 | ............ C25B 15/08 |

OTHER PUBLICATIONS

JP-2015030653-A translation (Year: 2025).*
Baier et al. "A Cost Estimation for CO2 Reduction and Reuse by Methanation from Cement Industry Sources in Switzerland," Frontiers in Energy Research 2018, vol. 6, article 5, pp. 1-9 (cited in the International Search Report).
International Search Report of the International Searching Authority mailed Dec. 28, 2021 for the corresponding international application No. PCT/JP2021/035940 (and English translation).
Supplementary European Search Report dated Sep. 18, 2024 issued for the corresponding European Patent Application No. 21906095.

* cited by examiner

CEMENT CLINKER PRODUCTION SYSTEM AND CEMENT CLINKER PRODUCTION METHOD

CROSS REFERENCE TO RELATED APPLICATIONS

This application is a U.S. national stage application of PCT/JP2021/035940 filed on Sep. 29, 2021, that claims priority from Japanese Patent Application No. 2020-208955 filed on Dec. 17, 2020, Japanese Patent Application No. 2021-048117 filed on Mar. 23, 2021, and Japanese Patent Application No. 2021-049868 filed on Mar. 24, 2021, the contents of which are incorporated herein by reference.

TECHNICAL FIELD

The present invention relates to a cement clinker producing system and a cement clinker producing method.

BACKGROUND ART

In recent years, reduction in emission amount of carbon dioxide has been a critical issue in order to curb global warming. Meanwhile, the cement industry is one of the industries that emit a large amount of carbon dioxide.

About 60% of a total amount of carbon dioxide gas (gaseous carbon dioxide) emitted in manufacture of cement is a carbon dioxide gas emitted due to decarbonation of limestone used as a raw material of cement, and about 40% is a carbon dioxide gas emitted due to combustion of fuel used in the manufacture.

Examples of a method of reducing a carbon dioxide gas generated as a result of the combustion of fuel include a method of improving energy efficiency and a method of using a biomass fuel as fuel. For example, as a cement burning apparatus that can reduce the amount of carbon dioxide gas generated as a result of the combustion of fuel, a cement burning apparatus including a main burner is described in Patent Literature 1. The main burner blows a flammable gas corresponding to a main fuel and a combustible waste corresponding to an auxiliary fuel into a cement kiln.

Meanwhile, it is difficult to use a calcium-containing raw material, which generates a smaller amount of carbon dioxide gas, as a raw material of cement in place of limestone, which generates a larger amount of carbon dioxide gas. Thus, it is difficult to reduce the amount of carbon dioxide gas that is generated as a result of the decarbonation of limestone.

As a method of reducing the emission amount of carbon dioxide, there is known a method of separating, recovering, and then storing, isolating, or effectively using a generated carbon dioxide gas.

As a method of separating and recovering the generated carbon dioxide gas, the following method of separating and recovering carbon dioxide is described, for example, in Patent Literature 2. The method allows carbon dioxide to be separated and recovered from a by-product gas generated in a steel plant by a chemical absorption technique. Low-quality exhaust heat having a temperature of 500° C. or lower generated in the steel plant is used or utilized in a process of absorbing carbon dioxide with a chemical absorbing liquid from the gas and then heating the chemical absorbing liquid so as to separate carbon dioxide.

CITATION LIST

Patent Literature

[PTL 1] JP 2018-52746 A
[PTL 2] JP 2004-292298 A

SUMMARY OF INVENTION

Technical Problem

An exhaust gas that is generated during the manufacture of cement clinker contains a large amount of, for example, nitrogen and oxide in addition to the carbon dioxide gas. Thus, in order to separate and recover the carbon dioxide gas from the exhaust gas, for example, it is required to use a chemical absorption technique using an amine compound.

When a concentration of the carbon dioxide gas contained in the exhaust gas is successfully increased, it becomes easier to separate and recover the carbon dioxide gas. A volume of the generated exhaust gas can be relatively reduced by decreasing the amount of, for example, nitrogen contained in the exhaust gas. As a result, a facility for separating and recovering a carbon dioxide gas can be downsized.

An object of the present invention is to provide a cement clinker producing system capable of providing a gas containing a carbon dioxide gas at a high concentration that is easy to use for, for example, fixation of carbon dioxide and generation of methane by increasing a carbon dioxide gas concentration for a part of an exhaust gas in manufacture of cement clinker, a cement clinker producing system capable of effectively generating methane by using the carbon dioxide gas, or a cement clinker producing system capable of reducing an emission amount of an exhaust gas.

Solution to Problem

As a result of extensive studies conducted to solve the above-mentioned problems, the inventors of the present invention have completed the present invention by finding that the above-mentioned object is successfully achieved with a cement clinker producing system including: a cyclone preheater configured to preheat a cement clinker raw material; a rotary kiln configured to burn the preheated cement clinker raw material so as to provide cement clinker; a calcination furnace, which is disposed on a front stream side of the rotary kiln, and is configured to promote decarbonation of the cement clinker raw material; a clinker cooler, which is disposed on a rear stream side of the rotary kiln, and is configured to cool the cement clinker; a kiln exhaust-gas discharge passage configured to discharge an exhaust gas generated in the rotary kiln after the exhaust gas passes through the cyclone preheater; a combustion-supporting gas supply device configured to supply a combustion-supporting gas having a higher oxygen concentration than an oxygen concentration of air; a combustion-supporting gas supply passage configured to guide the combustion-supporting gas to the calcination furnace; and a calcination furnace exhaust-gas discharge passage configured to discharge an exhaust gas generated in the calcination furnace, the calcination furnace exhaust-gas discharge passage being different from the kiln exhaust-gas discharge passage.

That is, the present invention provides Items [1] to [16] given below.

[1] A cement clinker producing system (a cement clinker manufacturing system), including: a cyclone preheater for preheating a cement clinker raw material; a rotary kiln for burning the cement clinker raw material preheated in the cyclone preheater so as to provide cement clinker; a calcination furnace, which is disposed together with the cyclone preheater on a front stream side (an upstream side) of the rotary kiln, and is for promoting decarbonation of the cement clinker raw material; a clinker cooler, which is disposed on a rear stream side (an downstream side) of the rotary kiln, and is for cooling the cement clinker; and a kiln exhaust-gas discharge passage for discharging an exhaust gas generated in the rotary kiln after the exhaust gas passes through the cyclone preheater; wherein the cement clinker producing system further including: a combustion-supporting gas supply device for supplying a combustion-supporting gas (oxidizing gas, combustion a sustaining gas) having a higher oxygen concentration than an oxygen concentration of air; a combustion-supporting gas supply passage for supplying the combustion-supporting gas from the combustion-supporting gas supply device to the calcination furnace; and a calcination furnace exhaust-gas discharge passage for discharging a carbon dioxide gas-containing exhaust gas generated in the calcination furnace, the calcination furnace exhaust-gas discharge passage being different from the kiln exhaust-gas discharge passage.

[2] The cement clinker producing system according to Item [1], further including a chlorine bypass device configured to extract and cool a part of the exhaust gas generated in the rotary kiln without allowing the part of the exhaust gas to pass through the cyclone preheater, remove solids, and then discharge an exhaust gas without the solids and classify the solids into coarse powder and fine powder so that the coarse powder is used as a part of the cement clinker raw material and the fine powder is recovered.

[3] The cement clinker producing system according to Item [1] or [2], further including a merging flow passage for merging a part of the carbon dioxide gas-containing exhaust gas flowing through the calcination furnace exhaust-gas discharge passage into the combustion-supporting gas flowing through the combustion-supporting gas supply passage.

[4] The cement clinker producing system according to Item [1] or [2], further including: a preheated raw-material supply passage for supplying the preheated cement clinker raw material from the cyclone preheater to the calcination furnace; a first recovery means, which is disposed in the calcination furnace exhaust-gas discharge passage, and is for recovering a quicklime-containing raw material from the carbon dioxide gas-containing exhaust gas; and a calcination furnace exhaust-gas supply passage, which is coupled to the calcination furnace exhaust-gas discharge passage at a position on a rear stream side of the first recovery means in the calcination furnace exhaust-gas discharge passage, and is for merging a part of the carbon dioxide gas-containing exhaust gas flowing through the calcination furnace exhaust-gas discharge passage into the combustion-supporting gas flowing through the combustion-supporting gas supply passage, in which the cyclone preheater includes two or more cyclone heat exchangers, in which the calcination furnace includes a heating means and is for promoting the decarbonation of the cement clinker raw material with use of the heating means, and in which the combustion-supporting gas supply passage allows heat exchange between the carbon dioxide gas-containing exhaust gas flowing through the calcination furnace exhaust-gas discharge passage and the combustion-supporting gas at a position on a front stream side of the first recovery means in the calcination furnace exhaust-gas discharge passage.

[5] The cement clinker producing system according to Item [4], further including a fuel conveying gas (a fuel carrying gas) supply passage (a passage for supplying a gas which is for conveying fuel), which branches (extends) from at least one of a position in the combustion-supporting gas supply passage, which is closer to the combustion-supporting gas supply device than a portion at which the carbon dioxide gas-containing exhaust gas and the combustion-supporting gas are allowed to exchange heat, or a position in the calcination furnace exhaust-gas supply passage, and is for supplying a fuel conveying gas (a gas for conveying fuel) to the heating means of the calcination furnace.

[6] The cement clinker producing system according to Item [4] or [5], further including an air supply passage for conveying (for guiding) air in the clinker cooler from the clinker cooler into the kiln exhaust-gas discharge passage.

[7] The cement clinker producing system according to any one of Items [4] to [6], in which the preheated raw-material supply passage is coupled to any one of second to subsequent cyclone heat exchangers from a rearmost stream side in the two or more cyclone heat exchangers of the cyclone preheater, and in which the cement clinker producing system further includes: a quicklime-containing raw material supply passage for supplying the quicklime-containing raw material recovered by the first recovery means from the first recovery means to the cyclone heat exchanger coupled to the preheated raw-material supply passage or a cyclone heat exchanger located on a front stream side of the cyclone heat exchanger in the two or more cyclone heat exchangers; a first decarbonated raw-material supply passage for supplying the cement clinker raw material decarbonated in the calcination furnace from the calcination furnace to the rotary kiln; a second decarbonated raw-material supply passage for supplying a part of the decarbonated cement clinker raw material from the first decarbonated raw-material supply passage to a cyclone heat exchanger located on a rearmost stream side in the two or more cyclone heat exchangers; a temperature measurement device for measuring a temperature of the exhaust gas in the kiln exhaust-gas discharge passage when the exhaust gas passes through the cyclone heat exchanger coupled to the preheated raw-material supply passage; and a decarbonated raw-material supply amount controller for adjusting an amount of the decarbonated cement clinker raw material to be supplied from the second decarbonated raw-material supply passage to the cyclone heat exchanger located on the rearmost stream side based on the temperature measured by the temperature measurement device and adjusting a temperature in the cyclone heat exchanger coupled to the preheated raw-material supply passage through the adjustment.

[8] The cement clinker producing system according to Item [7], further including a water supply device for supplying water or a water-containing waste to the exhaust gas flowing through the kiln exhaust-gas discharge passage when the exhaust gas passes through a part, which is located between a portion coupled to the rotary kiln and a portion on a front stream side of the cyclone heat exchanger located on the rearmost stream side.

[9] The cement clinker producing system according to Item [7] or [8], further including a denitrating-agent supply device for supplying a denitrating agent to the exhaust gas flowing through the kiln exhaust-gas discharge passage when the exhaust gas passes through a part, which is located between a portion coupled to the rotary kiln and a portion on a front stream side of the cyclone heat exchanger located on the rearmost stream side.

[10] The cement clinker producing system according to any one of Items [1] to [3], further including: a mixing device for mixing the carbon dioxide gas-containing exhaust gas and a hydrogen gas to prepare a gas mixture of the carbon dioxide gas-containing exhaust gas and the hydrogen gas and adjust a temperature of the gas mixture; a hydrogen-gas supply device for supplying the hydrogen gas; a hydrogen-gas supply passage for guiding the hydrogen gas from the hydrogen-gas supply device to the mixing device; a methane generator for generating methane and steam through a reaction caused with use of a catalyst between a carbon dioxide gas and the hydrogen gas that are contained in the gas mixture; and a gas-mixture supply passage for guiding the gas mixture from the mixing device to the methane generator, in which the calcination furnace exhaust-gas discharge passage is for guiding the carbon dioxide gas-containing exhaust gas from the calcination furnace to the mixing device.

[11] The cement clinker producing system according to Item [10], further including a methane supply passage configured for supplying, to the calcination furnace, a methane-containing gas that contains the methane generated in the methane generator.

[12] The cement clinker producing system according to Item [10] or [11], in which the combustion-supporting gas supply device and the hydrogen-gas supply device are a water electrolysis device for electrolyzing water to provide a hydrogen gas and an oxygen gas.

[13] A cement clinker producing method (a cement clinker manufacturing method) for producing (manufacturing) cement clinker by using the cement clinker producing system of any one of Items [1] to [9], the cement clinker producing method including recovering the carbon dioxide gas-containing exhaust gas so as to use a carbon dioxide gas in the carbon dioxide gas-containing exhaust gas.

[14] The cement clinker producing method according to Item [13], in which an oxygen concentration of the combustion-supporting gas is adjusted so that a carbon dioxide gas concentration of the carbon dioxide gas-containing exhaust gas becomes 80% by volume or higher to a volume of 100% by volume, excluding steam (to a volume of 100% by volume of the carbon dioxide gas-containing exhaust gas excluding stream).

[15] The cement clinker producing method according to Item [13] or [14], in which methane is generated from a hydrogen gas and the carbon dioxide gas in the recovered carbon dioxide gas-containing exhaust gas through use of a catalyst so that the generated methane is used as fuel for at least one of the rotary kiln or the calcination furnace.

[16] The cement clinker producing method according to any one of Items [13] to [15], in which, after the recovered carbon dioxide gas-containing exhaust gas and a calcium-containing waste are brought into contact with each other and the carbon dioxide gas contained in the carbon dioxide gas-containing exhaust gas is absorbed by the calcium-containing waste, the calcium-containing waste that has absorbed the carbon dioxide gas is used as a cement clinker raw material.

Advantageous Effects of Invention

The cement clinker producing system according to the present invention can provide the gas containing a carbon dioxide gas at a high concentration that is easy to use for, for example, the fixation of carbon dioxide and the generation of methane by increasing the carbon dioxide gas concentration for a part of the exhaust gas in the manufacture of the cement clinker.

The cement clinker producing system according to the present invention can efficiently generate methane by using the carbon dioxide gas.

The cement clinker producing system according to the present invention can reduce the emission amount of exhaust gas.

DESCRIPTION OF EMBODIMENTS

Figure 1:
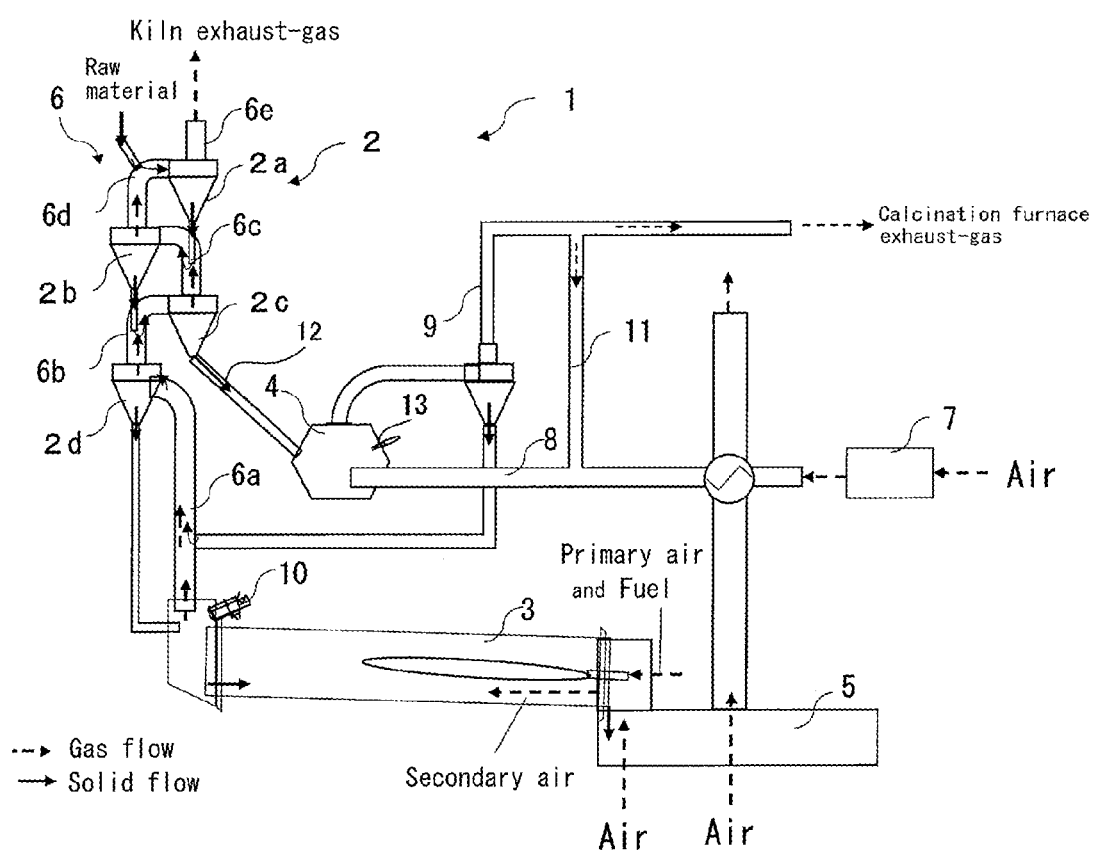
FIG. 1 is a view for schematically illustrating an example of a cement clinker producing system according to the present invention.
Figure 2:
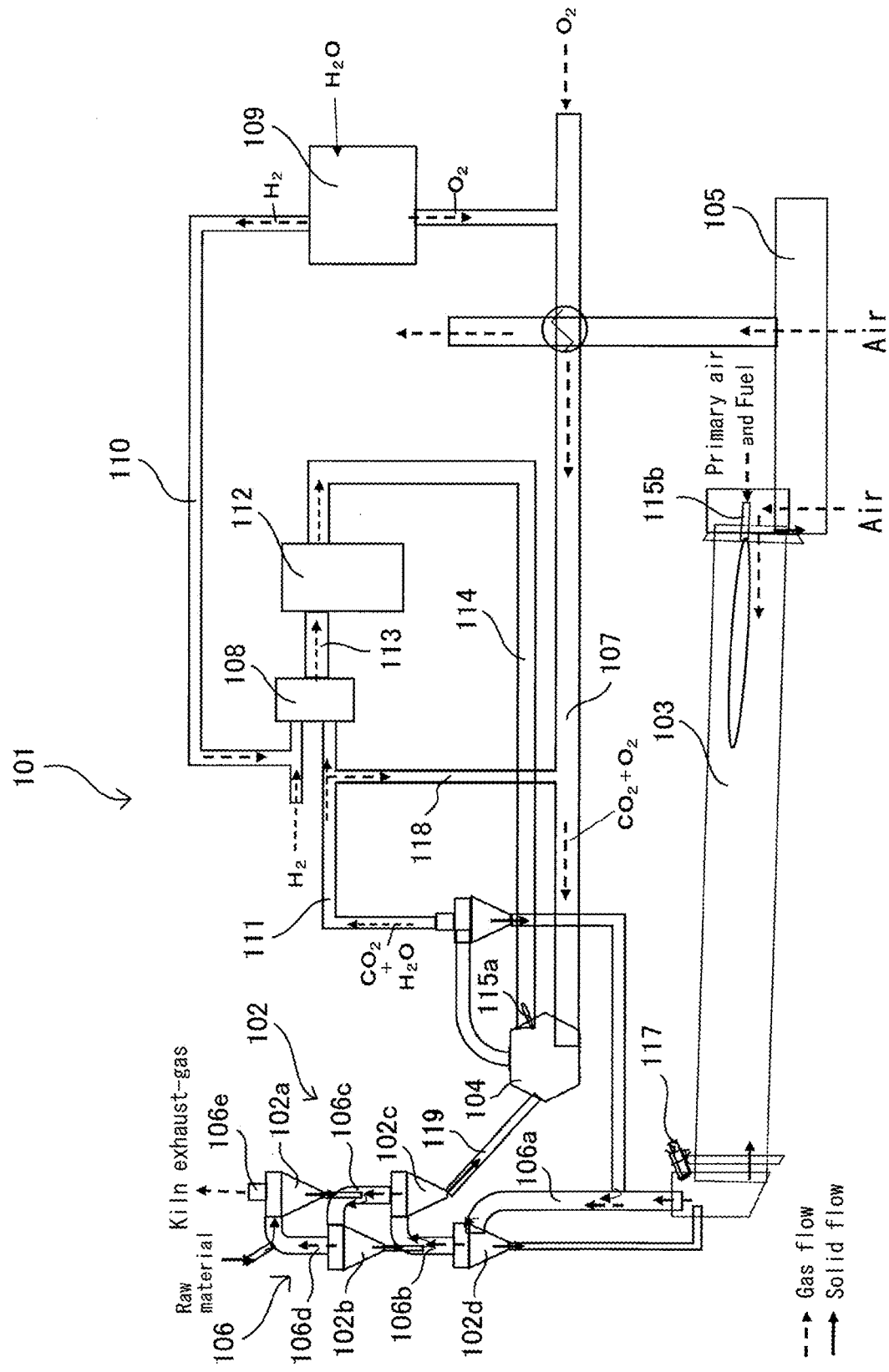
FIG. 2 is a view for schematically illustrating an example of the cement clinker producing system according to the present invention.
Figure 3:
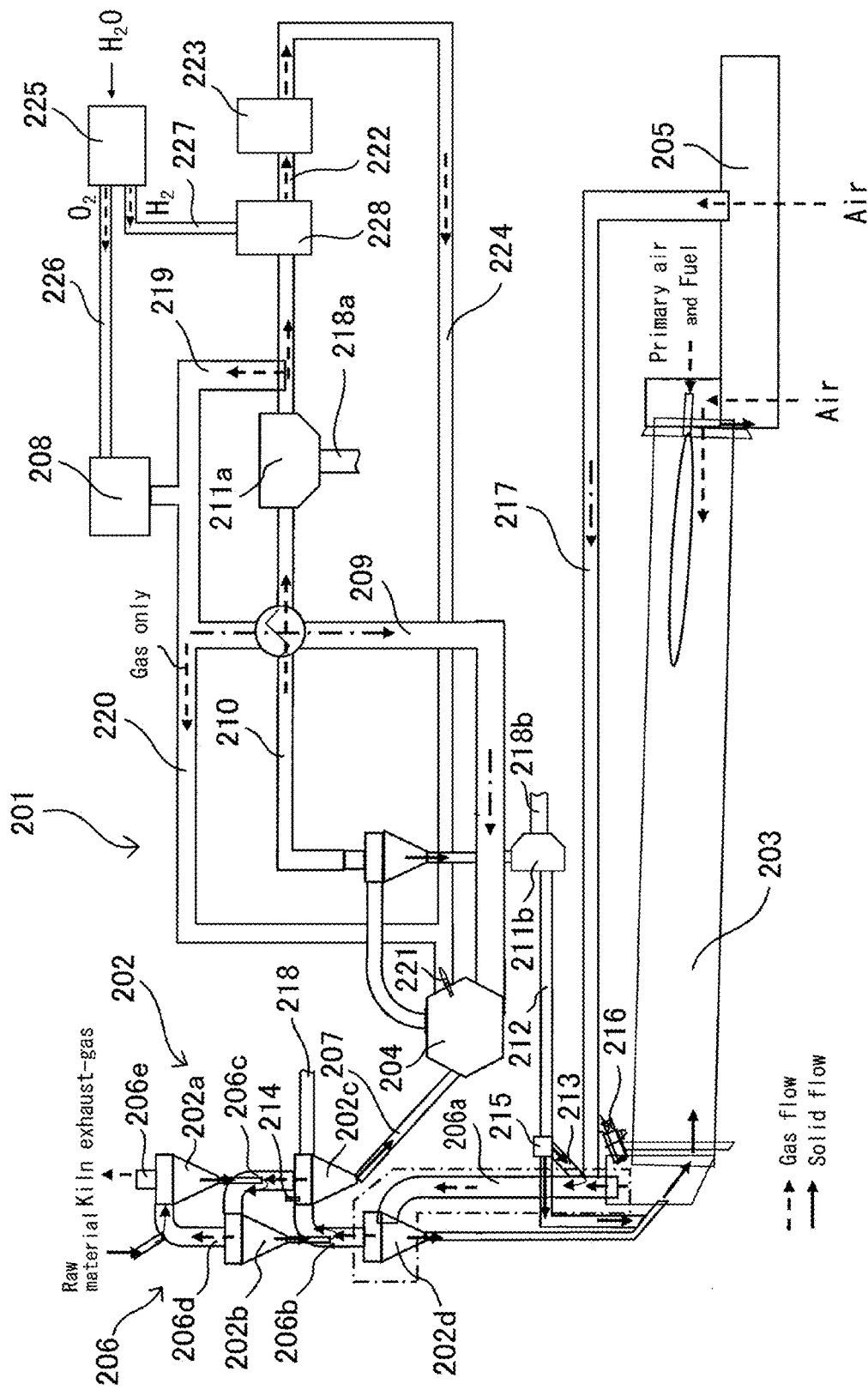
FIG. 3 is a view for schematically illustrating an example of the cement clinker producing system according to the present invention.

FIG. 1 to FIG. 3 are views each for schematically illustrating an example of a cement clinker producing system according to an embodiment of the present invention.

Now, the cement clinker producing system according to the present invention is described in detail with reference to FIG. 1 to FIG. 3.

A cement clinker producing system 1 illustrated in FIG. 1 includes a cyclone preheater 2, a rotary kiln 3, a calcination furnace 4, a clinker cooler 5, and a kiln exhaust-gas discharge passage 6. The cyclone preheater 2 is configured to preheat a cement clinker raw material. The rotary kiln 3 is configured to burn the cement clinker raw material that has been preheated in the cyclone preheater 2 so as to provide cement clinker. The calcination furnace 4 is disposed together with the cyclone preheater 2 on a front stream side of the rotary kiln 3 and is configured to promote decarbonation of the cement clinker raw material. The clinker cooler 5 is disposed on a rear stream side of the rotary kiln 3 and is configured to cool the cement clinker. The kiln exhaust-gas discharge passage 6 is configured to discharge an exhaust gas generated in the rotary kiln 3 (also simply referred to as "kiln exhaust gas"), which has passed through the cyclone preheater 2. The cement clinker producing system 1 includes a combustion-supporting gas supply device 7, a combustion-supporting gas supply passage 8, and a calcination furnace exhaust-gas discharge passage 9 (that should be different from the kiln exhaust-gas discharge passage 6). The combustion-supporting gas supply device 7 is configured to supply a combustion-supporting gas having a higher oxygen concentration than that of air. The combustion-supporting gas supply passage 8 is configured to guide the combustion-supporting gas from the combustion-supporting gas supply device to the calcination furnace 4. The calcination furnace exhaust-gas discharge passage 9 is configured to discharge a carbon dioxide gas-containing exhaust gas generated in the calcination furnace 4.

The cyclone preheater 2 includes a plurality of (two or more) cyclone heat exchangers 2a to 2d. The plurality of cyclone heat exchangers 2a to 2d are coupled to each other through a flow passage for moving the cement clinker raw material and kiln exhaust-gas discharge passages 6a to 6e. The kiln exhaust-gas discharge passages 6a to 6e are configured to discharge the exhaust gas generated in the rotary kiln 3, which has passed through the plurality of cyclone heat exchangers 2a to 2d. The kiln exhaust-gas discharge passages 6a to 6e may also serve as flow passages for moving the cement clinker raw material. The number of cyclone heat exchangers is not limited to a particular number. However, the number of cyclone heat exchangers is two or more, generally, four or five. The plurality of cyclone heat exchangers are generally arranged in a vertical direction.

The cement clinker raw material is loaded into the cyclone heat exchanger 2a that is disposed on a frontmost stream side in the cyclone preheater 2. In the cyclone heat exchanger 2a, the cement clinker raw material is centrifuged while exchanging heat with the kiln exhaust gas. After being loaded from a lower part of the cyclone heat exchanger 2a into the cyclone heat exchanger 2b disposed on a rear stream side of the cyclone heat exchanger 2a, the cement clinker raw material is centrifuged again while exchanging heat with the exhaust gas. Further, the cement clinker raw material is loaded into the cyclone heat exchanger 2c disposed on a rear stream side of the cyclone heat exchanger 2b. As described above, after moving through the cyclone heat exchangers 2b and 2c disposed on the rear stream side in the stated order while being preheated (heated) with the exhaust gas, the cement clinker raw material passes through a preheated raw-material supply passage 12 configured to supply the preheated cement clinker raw material from the cyclone preheater 2 into the calcination furnace 4 and is loaded (supplied) into the calcination furnace 4.

A loading amount of fuel to be used for promoting decarbonation in the calcination furnace 4 can be reduced by preheating the cement clinker raw material in the cyclone preheater 2.

In the cyclone preheater 2, the cement clinker raw material is preheated at a temperature falling within a range of preferably from 400° C. to 900° C., more preferably from 500° C. to 850° C., further preferably from 550° C. to 800° C., particularly preferably from 600° C. to 750° C. When the temperature is 400° C. or higher, the loading amount of the fuel to be used for promoting the decarbonation in the calcination furnace can be reduced. When the temperature is 900° C. or lower, the decarbonation of the cement clinker raw material is less likely to be promoted in the cyclone preheater 2. Thus, a concentration of the carbon dioxide gas in the kiln exhaust gas can be prevented from being increased.

A temperature in the cyclone preheater 2 is generally lower than a temperature (described later) in the calcination furnace 4 by 50° C. to 100° C.

The cement clinker raw material is not limited to a particular one, and a common cement clinker raw material may be used. Specific examples thereof include: natural raw materials, such as limestone, soil, clay, silica stone, and an iron raw material; and wastes or by-products, such as coal ash, iron steel slag, urban refuse incineration ash, sewage sludge incineration ash, ready-mixed concrete sludge, and waste concrete fine powder. A calcium-containing waste (described later) that absorbs a carbon dioxide gas may be used as the cement clinker raw material.

After various raw materials are pulverized and mixed in appropriate proportions by using a raw-material mill, the cement clinker raw material is loaded into the cyclone preheater 2. For easier manufacture of cement clinker, a particle size of the cement clinker raw material is preferably set to 100 μm or smaller.

A part (for example, contaminated soil containing a large amount of organic matter) of the cement clinker raw material may be loaded directly into the rotary kiln 3 instead of being loaded into the cyclone preheater 2.

The calcination furnace 4 is disposed together with the cyclone preheater 2 on the front stream side of the rotary kiln 3 for the purpose of promoting the decarbonation of the cement clinker raw material.

In FIG. 1, the calcination furnace 4 is disposed between the cyclone heat exchanger 2c, which is a second cyclone heat exchanger from a rear stream side in the cyclone preheater 2, and the cyclone heat exchanger 2d, which is disposed on a rearmost stream side. The cement clinker raw material, which has been preheated through the cyclone heat exchangers 2a to 2c, is loaded from the cyclone heat exchanger 2c into the calcination furnace 4. The cement clinker raw material loaded into the calcination furnace 4 is heated in the calcination furnace 4, and thus the decarbonation of the cement clinker raw material is promoted.

In this case, the decarbonation of the cement clinker raw material refers to decomposition of calcium carbonate ($CaCO_3$), which is a main component of limestone contained in the cement clinker raw material, into quicklime ($CaO$) and a carbon dioxide gas ($CO_2$) through heating.

When the cement clinker raw material is heated with use of a combustion-supporting gas having a higher oxygen concentration than that of air in the calcination furnace 4, a carbon dioxide partial pressure increases. As a result, a higher temperature is required to promote the decarbonation. Thus, the temperature is required to be set higher than a temperature that is set when air is used as the combustion-supporting gas. Accordingly, the temperature at which the cement clinker raw material is heated falls within a range of preferably from 850° C. to 1,100° C., more preferably from 880° C. to 1,050° C., particularly preferably from 900° C. to 1,000° C. When the temperature is 850° C. or higher, the decarbonation of the cement clinker raw material can be further promoted even under an atmosphere in which the carbon dioxide partial pressure is high. When the temperature is 1,100° C. or lower, clogging due to, for example, sintering of the raw material can be prevented.

The decarbonation of the cement clinker raw material is promoted by combusting fuel with the combustion-supporting gas with use of, for example, a heating means 13 so as to directly heat the cement clinker raw material in the calcination furnace 4.

Examples of the heating means 13 include a burner.

The fuel to be used in the calcination furnace is not particularly limited, and examples thereof include: fossil fuels, such as coal, a heavy oil, and a natural gas; biomass such as a palm shell; a biogas obtained by gasifying biomass; and methane generated through methanation using a carbon dioxide gas as a raw material. Those fuels may be used alone or in combination thereof.

Among the above-mentioned fuels, when a carbon-free fuel such as biomass is used, an emission amount of carbon dioxide in the manufacture of cement clinker can be substantially further reduced.

As a gas (hereinafter also referred to as "fuel carrying gas") to be used for carrying a solid fuel such as coal or biomass or a liquid fuel such as a heavy oil to the heating means 13 provided in the calcination furnace 4, a carbon dioxide gas or a gas mixture of a carbon dioxide gas and a combustion-supporting gas (for example, oxygen) is preferred. As the carrying gas, a gas obtained by cooling the carbon dioxide gas-containing exhaust gas generated in the calcination furnace 4 may be used.

The use of those fuel carrying gases can further increase a concentration of the carbon dioxide gas in the carbon dioxide gas-containing exhaust gas discharged from the calcination furnace exhaust-gas discharge passage 9 and further reduce a volume of the carbon dioxide gas-containing exhaust gas.

The combustion-supporting gas to be used in the calcination furnace 4 has a higher oxygen concentration than that of air. The use of such a combustion-supporting gas can further increase the carbon dioxide gas concentration of the carbon dioxide gas-containing exhaust gas generated in the calcination furnace 4 (hereinafter, sometimes referred to simply as "carbon dioxide gas-containing exhaust gas"). The use of the combustion-supporting gas further improves combustibility of fuel. Thus, even fuel, which has hitherto been difficult to use because of its difficulty in pulverization into small particles, can be used.

For a further increase in the carbon dioxide gas concentration of the carbon dioxide gas-containing exhaust gas, the oxygen concentration of the combustion-supporting gas is preferably 21% by volume or higher, more preferably 25% by volume or higher, particularly preferably 30% by volume or higher to a volume of 100% by volume, including steam. For easier control of the combustion, the oxygen concentration is preferably 90% by volume or lower, more preferably 80% by volume or lower, further preferably 70% by volume or lower, still further preferably 60% by volume or lower, particularly preferably 50% by volume or lower.

The combustion-supporting gas to be used in the calcination furnace 4 is supplied from the combustion-supporting gas supply device 7 and is guided to the calcination furnace 4 through the combustion-supporting gas supply passage 8.

The combustion-supporting gas supply passage 8 may be defined so that the combustion-supporting gas passing through the combustion-supporting gas supply passage 8 is indirectly heated and a temperature of the combustion-supporting gas is raised with air having a temperature raised through the heat exchange with the cement clinker in the clinker cooler 5. The temperature of the combustion-supporting gas may be raised with heat of the cement clinker by defining the combustion-supporting gas supply passage 8 passing through a part on a rear stream side of a cement cooler (outlet side of the clinker cooler).

A loading amount of the fuel used in the calcination furnace 4 can be reduced by raising the temperature of the combustion-supporting gas.

Examples of the combustion-supporting gas supply device 7 configured to supply the combustion-supporting gas into the calcination furnace 4 include an oxygen tank, an air separation unit (ASU) that separates oxygen from air, and a water electrolysis device that generates oxygen through electrolysis of water.

Examples of a method of separating oxygen from air include cryogenic separation, adsorptive separation, and membrane separation. Among the above-mentioned methods, the cryogenic separation is preferred in terms of generation of a large amount of oxygen.

The combustion-supporting gas supplied from the combustion-supporting gas supply device 7 has a higher oxygen concentration than that of air. The combustion-supporting gas may be directly used in the calcination furnace 4. However, a composition of the combustion-supporting gas may be appropriately adjusted before the combustion-supporting gas is used in the calcination furnace 4.

For example, for preventing combustion control from becoming difficult due to an excessive increase in the oxygen concentration of the combustion-supporting gas used in the calcination furnace 4, further increasing the carbon dioxide gas concentration of the carbon dioxide gas-containing exhaust gas, and reducing the amount of oxygen remaining in the carbon dioxide gas-containing exhaust gas, a gas mixture obtained by mixing the combustion-supporting gas supplied from the combustion-supporting gas supply device 7 and a carbon dioxide gas may be used as the combustion-supporting gas to be used in the calcination furnace 4.

For the purpose of reducing the carbon dioxide partial pressure and thereby decreasing a temperature required to promote decarbonation, a gas mixture obtained by mixing the combustion-supporting gas supplied from the combustion-supporting gas supply device 7 and steam may be used as the combustion-supporting gas to be used in the calcination furnace 4.

A carbon dioxide gas concentration of the above-mentioned gas mixture (mixture of the combustion-supporting gas supplied from the combustion-supporting gas supply device 7 and at least one of a carbon dioxide gas or steam) falls within a range of preferably from 10% by volume to 79% by volume, more preferably from 20% by volume to 75% by volume, further preferably from 30% by volume to 70% by volume to a volume of 100% by volume, including steam.

For further reduction in the volume of the exhaust gas generated in the calcination furnace 4 and a further increase in the carbon dioxide gas concentration of the exhaust gas, it is preferred that the combustion-supporting gas used in the calcination furnace 4 do not contain a gas (for example, nitrogen) other than oxygen, a carbon dioxide gas, and steam. A concentration of a gas other than oxygen, a carbon dioxide gas, and steam in the combustion-supporting gas is preferably 10% by volume or lower, more preferably 5% by volume or lower, particularly preferably 2% by volume or lower to a volume of 100% by volume, including steam.

Examples of a method of mixing the combustion-supporting gas supplied from the combustion-supporting gas supply device 7 and a carbon dioxide gas include a method of mixing the combustion-supporting gas supplied from the combustion-supporting gas supply device 7 and the carbon dioxide gas-containing exhaust gas. A temperature of the carbon dioxide gas-containing exhaust gas discharged from the calcination furnace 4 is as high as about 800° C. Thus, the use of the exhaust gas can raise the temperature of the combustion-supporting gas.

When the carbon dioxide gas-containing exhaust gas is to be mixed, it is only required that a merging flow passage 11 be defined so as to mix the combustion-supporting gas flowing through the combustion-supporting gas supply passage 8 and the exhaust gas together. The merging flow passage 11 is configured to merge a part of the exhaust gas flowing through the carbon dioxide gas-containing exhaust gas discharge passage 9 (that should be different from the kiln exhaust-gas discharge passages 6a to 6e) configured to discharge the exhaust gas generated in the calcination furnace 4 into the combustion-supporting gas (combustion-supporting gas supplied from the combustion-supporting gas supply device 7) flowing through the combustion-supporting gas supply passage 8.

When the combustion-supporting gas supply passage 8 is defined so as to indirectly heat the combustion-supporting gas passing through the combustion-supporting gas supply passage 8 with air having a temperature raised through the heat exchange with the cement clinker in the clinker cooler 5 and raise the temperature of the combustion-supporting gas, it is preferred that the merging flow passage 11 be defined so that the combustion-supporting gas and a part of the exhaust gas merge at a position after the combustion-supporting gas is indirectly heated with the air.

The carbon dioxide gas-containing exhaust gas is discharged from the calcination furnace exhaust-gas discharge passage 9. After dust is removed from the carbon dioxide gas-containing exhaust gas with use of, for example, a cyclone collector, a bag filter, or an electric dust collector, water is removed. Subsequently, a carbon dioxide gas is separated and recovered therefrom.

The calcination furnace exhaust-gas discharge passage 9 is different from the kiln exhaust-gas discharge passages 6a to 6e configured to discharge the exhaust gas generated in the rotary kiln 3. The calcination furnace exhaust-gas discharge passage 9 and the kiln exhaust-gas discharge passages 6a to 6e are defined completely separately. As a result, only the carbon dioxide gas-containing exhaust gas having a high carbon dioxide gas concentration can be recovered.

The carbon dioxide gas-containing exhaust gas has a high carbon dioxide gas concentration. Thus, it is easy to separate and recover a carbon dioxide gas from the carbon dioxide gas-containing exhaust gas. The carbon dioxide gas concentration of the carbon dioxide gas-containing exhaust gas is preferably 80% by volume or higher, more preferably 85% by volume or higher, particularly preferably 90% by volume or higher to a volume of 100% by volume, excluding steam.

The above-mentioned carbon dioxide gas concentration can be obtained by adjusting an oxygen concentration of the combustion-supporting gas. More specifically, the carbon dioxide gas concentration can be increased by increasing the oxygen concentration of the combustion-supporting gas or reducing a concentration of a gas (for example, nitrogen) other than oxygen, a carbon dioxide gas, and steam in the combustion-supporting gas.

The temperature of the carbon dioxide gas-containing exhaust gas differs depending on conditions of the decarbonation in the calcination furnace 4 and generally falls within a range of from 700° C. to 900° C. The carbon dioxide gas-containing exhaust gas has a high temperature. Thus, steam may be generated by heating water with the exhaust gas so that electric power is generated with use of the steam and a steam turbine.

The carbon dioxide gas may be purified by removing, for example, oxygen, nitrogen, and steam from the carbon dioxide gas-containing exhaust gas. When the carbon dioxide gas-containing exhaust gas has a high concentration of carbon dioxide gas, the carbon dioxide gas can be purified by liquification through direct compression and cooling without being separated and recovered with use of a chemical absorbent such as amine.

After the decarbonation is promoted in the calcination furnace 4, the cement clinker raw material is loaded into the cyclone heat exchanger 2d that is disposed on the rearmost stream side in the cyclone preheater 2 while maintaining a high temperature achieved through heating. Subsequently, the cement clinker raw material is loaded into the rotary kiln 3.

The calcination furnace may be disposed between the cyclone preheater and the rotary kiln so that the cement clinker raw material is directly loaded into the rotary kiln after the decarbonation is promoted in the calcination furnace (not shown).

The cement clinker can be obtained by burning the cement clinker raw material in the rotary kiln 3. A temperature at which the cement clinker raw material is burnt may be a typical temperature used in the cement clinker manufacture, and is generally 1,400° C. or higher.

The same fuel as that used in the calcination furnace 4 may be used as fuel to be used to burn the cement clinker raw material in the rotary kiln 3. Contaminated soil containing a large amount of organic components or an uncrushable fuel such as a waste tire may be directly loaded from a raw-material loading port of the rotary kiln 3.

After the exhaust gas generated in the rotary kiln 3 flows through the kiln exhaust-gas discharge passages 6a to 6e configured to discharge the exhaust gas that has passed through the cyclone preheater 2, the exhaust gas is discharged from a top of the cyclone preheater 2. After dust is removed with use of, for example, a cyclone collector, a bag filter, or an electric dust collector, the exhaust gas is discharged to an outside through a chimney.

For further reduction in the emission amount of carbon dioxide, a carbon dioxide gas may be separated and recovered from the kiln exhaust gas.

Examples of a method of separating and recovering a carbon dioxide gas from the kiln exhaust gas include a chemical absorption technique using, for example, monoethanolamine as a carbon dioxide absorbent, calcium looping using quicklime as a carbon dioxide absorbent, a solid adsorption method, and a membrane separation method.

Quicklime to be used in calcium looping may be obtained by decarbonation of limestone. Limestone that has undergone repeated use may be ultimately used as a cement clinker raw material.

A chlorine bypass device 10 may be disposed. The chlorine bypass device 10 is configured to extract and cool a part of the kiln exhaust gas without allowing the part of the kiln exhaust gas to pass through the cyclone preheater 2, remove solids, and then discharge an exhaust gas without the solids and classify the solids into coarse powder and fine powder so that the coarse powder is used as a part of the cement clinker raw material and the fine powder is recovered.

The "coarse powder" tends to contain a large amount of cement clinker raw material components and a small amount of chlorine, and the "fine powder" tends to contain a large amount of chlorine.

The chlorine bypass device 10 is generally disposed at a connecting portion between the cyclone preheater 2 and the rotary kiln 3. When the chlorine bypass device 10 is disposed, a larger amount of wastes containing chlorine, such as urban refuse incineration ash, can be used as a cement clinker raw material or fuel for the rotary kiln.

The kiln exhaust gas discharged from the chlorine bypass device 10 is generally returned to the kiln exhaust-gas discharge passage 6a.

The cement clinker obtained in the rotary kiln 3 is loaded into the clinker cooler 5 and is cooled. The clinker cooler 5 is disposed on a rear stream side of the rotary kiln 3 and is configured to cool the cement clinker.

For more efficient heating in the calcination furnace 4 and the rotary kiln 3, air that is used to cool the cement clinker may be divided into a front stream side and a rear stream side of the clinker cooler 5. The rear stream-side air that has cooled the cement clinker may be used to indirectly heat the combustion-supporting gas passing through the combustion-supporting gas supply passage 8.

Different gases may be used to cool the front stream side and the rear stream side. More specifically, air may be used as a gas for cooling the front stream side of the clinker cooler 5, and the combustion-supporting gas passing through the combustion-supporting gas supply passage 8 may be used as a gas for cooling the rear stream side.

After exchanging heat with the cement clinker having a high temperature, the gas for cooling the front stream side is used as a combustion-supporting gas for combusting the fuel in the rotary kiln 3. The gas for cooling the front stream side exchanges heat on an inlet side of the clinker cooler 5, and thus, after the heat exchange, has a higher temperature than a temperature of the gas for cooling the rear stream side.

Heating using electrical energy may be conducted as an aid to heating of the air and the combustion-supporting gas that are used when fuel is combusted in the rotary kiln and to heating in the rotary kiln and in the calcination furnace. Examples of a heating method using electrical energy include plasma heating, resistive heating, and microwave heating. When renewable energy is used as the electrical energy, the emission amount of carbon dioxide can be further reduced.

The method of manufacturing cement clinker using the above-mentioned cement clinker producing system may include recovery of the carbon dioxide gas-containing exhaust gas generated in the calcination furnace 4 so that a carbon dioxide gas in the exhaust gas is used.

Examples of the use of the carbon dioxide gas include methanation. Methanation refers to the generation of methane and water through a reaction between hydrogen and carbon dioxide.

More specifically, methanation is a method of generating methane from a hydrogen gas and a carbon dioxide gas contained in the exhaust gas through use of a catalyst.

A hydrogen gas can be obtained through, for example, electrolysis of water. When electrical energy derived from renewable energy such as water power, wind power, geothermal heat, or sunlight is used as electrical energy that is used in the electrolysis of water, the emission amount of carbon dioxide can be further reduced. At this time, oxygen is also generated. The oxygen may also be used as oxygen to be contained in the above-mentioned combustion-supporting gas.

Examples of the catalyst include Rh/Mn-based, Rh-based, Ni-based, Pd-based, and Pt-based catalysts. A carrier for supporting the catalyst may be used. Examples of the carrier include $CeO_2$, $ZrO_2$, $Y_2O_3$, $Al_2O_3$, $MgO$, $TiO_2$, and $SiO_2$. Those catalysts and carriers may appropriately be selected and used.

For further reduction in the emission amount of carbon dioxide, the resultant methane can be used as fuel for at least one of the rotary kiln 3 or the calcination furnace 4. The resultant methane may be separately used as fuel for power generation.

The examples of the use of a carbon dioxide gas further include carbonation of the calcium-containing waste.

More specifically, the carbonation of the calcium-containing waste refers to a method of bringing the exhaust gas and the calcium-containing waste into contact with each other to cause the calcium-containing waste to absorb a carbon dioxide gas contained in the exhaust gas. When the carbon dioxide gas is absorbed by the calcium-containing waste and is fixed, the emission amount of carbon dioxide into an atmosphere can be reduced. Examples of the calcium-containing waste include waste concrete.

The calcium-containing waste that has absorbed the carbon dioxide gas may be used as a cement clinker raw material in the above-mentioned cement clinker producing system.

The calcium-containing waste that has absorbed the carbon dioxide gas may be, for example, crushed and classified so as to be used as, for example, a subbase material or a concrete aggregate. Further, when the calcium-containing waste is waste concrete, only a paste component in the waste concrete that has absorbed a carbon dioxide gas may be separated and recovered so as to be used as a cement raw material.

In the methanation and the carbonation of the calcium-containing waste, which are described above, the carbon dioxide gas-containing exhaust gas is used directly for the methanation or the carbonation of the calcium-containing waste while maintaining its high temperature without being purified (without separation or removal of a carbon dioxide gas). As a result, the methanation or the carbonation of the waste concrete can be more efficiently performed.

In the manufacture of cement clinker using the above-mentioned cement clinker producing system, the carbon dioxide gas-containing exhaust gas generated in the calcination furnace 4 may be directly stored and isolated.

A cement clinker producing system 101 illustrated in FIG. 2 includes a cyclone preheater 102, a rotary kiln 103, a calcination furnace 104, a clinker cooler 105, and a kiln exhaust-gas discharge passage 106. The cyclone preheater 102 is configured to preheat a cement clinker raw material. The rotary kiln 103 is configured to burn the cement clinker raw material preheated in the cyclone preheater 102 to provide cement clinker. The calcination furnace 104 is disposed together with the cyclone preheater 102 on a front stream side of the rotary kiln 103 and is configured to promote decarbonation of the cement clinker raw material. The clinker cooler 105 is disposed on a rear stream side of the rotary kiln 103 and is configured to cool the cement clinker. The kiln exhaust-gas discharge passage 106 is configured to discharge an exhaust gas generated in the rotary kiln 103 after the exhaust gas passes through the cyclone preheater 102. The cement clinker producing system 101 includes a combustion-supporting gas supply device (that may be a water electrolysis device 109 also serving as a hydrogen-gas supply device described later), a combustion-supporting gas supply passage 107, a mixing device 108, a hydrogen-gas supply device 109, a hydrogen-gas supply passage 110, a calcination furnace exhaust-gas discharge passage 111 (that should be different from the kiln exhaust-gas discharge passage 106), a methane generator 112, and a gas-mixture supply passage 113. The combustion-supporting gas supply device is configured to supply a combustion-supporting gas having a higher oxygen concentration than that of air. The combustion-supporting gas supply passage 107 is configured to guide the combustion-supporting gas from the combustion-supporting gas supply device to the calcination furnace 104. The mixing device 108 is configured to mix a carbon dioxide gas-containing exhaust gas and a hydrogen gas so as to prepare a gas mixture of the carbon dioxide gas-containing exhaust gas and the hydrogen gas and adjust a temperature of the gas mixture. The hydrogen-gas supply device 109 is configured to supply the hydrogen gas. The hydrogen-gas supply passage 110 is configured to guide the hydrogen gas from the hydrogen-gas supply device 109 to the mixing device 108. The calcination furnace exhaust-gas discharge passage 111 is configured to discharge the carbon dioxide gas-containing exhaust gas generated in the calcination furnace 104. The methane generator 112 is configured to generate methane and steam through a reaction caused with use of a catalyst between a carbon dioxide gas and the hydrogen gas that are contained in the gas mixture. The gas-mixture supply passage 113 is configured to guide the gas mixture from the mixing device 108 to the methane generator 112. The calcination furnace exhaust-gas discharge passage 111 is configured to guide the carbon dioxide gas-containing exhaust gas from the calcination furnace 104 to the mixing device 108.

The cyclone preheater 102, cyclone heat exchangers 102a, 102b, 102c, and 102d, the rotary kiln 103, the clinker cooler 105, kiln exhaust-gas discharge passages 106, 106a, 106b, 106c, 106d, and 106e, a heating means 115a, and a chlorine bypass device 117 are the same as the above-mentioned cyclone preheater 2, cyclone heat exchangers 2a, 2b, 2c, and 2d, rotary kiln 3, clinker cooler 5, kiln exhaust-gas discharge passages 6, 6a, 6b, 6c, 6d, and 6e, heating means 13, and chlorine bypass device 10, respectively. The cement clinker raw material loaded into the cyclone preheater 102 is the same as the cement clinker raw material loaded into the above-mentioned cyclone preheater 2.

The calcination furnace 104 is the same as the above-mentioned calcination furnace 4. For reduction in the emission amount of carbon dioxide in the cement clinker manufacture and reduction of cost for fuel, it is preferred that methane generated through methanation in the methane generator 112 described later, which uses a carbon dioxide gas contained in the carbon dioxide gas-containing exhaust gas generated in the calcination furnace 104 as a raw material, be used as the fuel to be used in the calcination furnace 104.

The combustion-supporting gas used in the calcination furnace 104 is the same as the combustion-supporting gas used in the above-mentioned calcination furnace 4.

The combustion-supporting gas is supplied from the combustion-supporting gas supply device (water electrolysis device 109 in FIG. 2) and is guided to the calcination furnace 104 through the combustion-supporting gas supply passage 107.

The combustion-supporting gas supply device is the same as the above-mentioned combustion-supporting gas supply device 7. A water electrolysis device may be used as the combustion-supporting gas supply device. In this case, the combustion-supporting gas supply device may also serve as a hydrogen-gas supply device described later.

The combustion-supporting gas supply passage 107 is the same as the above-mentioned combustion-supporting gas supply passage 7.

Examples of a method of mixing the combustion-supporting gas supplied from the combustion-supporting gas supply device and a carbon dioxide gas include a method of mixing the combustion-supporting gas supplied from the combustion-supporting gas supply device and the carbon dioxide gas-containing exhaust gas. A temperature of the carbon dioxide gas-containing exhaust gas discharged from the calcination furnace 104 is as high as about 800° C. Thus, the use of the exhaust gas can raise a temperature of the combustion-supporting gas.

When the carbon dioxide gas-containing exhaust gas is to be mixed, it is only required that a merging flow passage 118 be defined so as to mix the combustion-supporting gas flowing through the combustion-supporting gas supply passage 107 and a part of the carbon dioxide gas-containing exhaust gas together. The merging flow passage 118 is configured to merge a part of the carbon dioxide gas-containing exhaust gas flowing through the calcination furnace exhaust-gas discharge passage 111 into the combustion-supporting gas (combustion-supporting gas supplied from the combustion-supporting gas supply device) flowing through the combustion-supporting gas supply passage 107.

When the combustion-supporting gas flow passage 107 is defined so as to indirectly heat the combustion-supporting gas flowing through the combustion-supporting gas supply passage 107 with air having a temperature raised through heat exchange with the cement clinker in the clinker cooler 105 and raise the temperature of the combustion-supporting gas, it is preferred that the merging flow passage 118 be defined so that the combustion-supporting gas and the part of the exhaust gas merge at a position after the combustion-supporting gas is indirectly heated with the air.

The carbon dioxide gas-containing exhaust gas generated in the calcination furnace 104 passes from the calcination furnace 104 through the calcination furnace exhaust-gas discharge passage (calcination furnace exhaust-gas supply passage) 111 and is guided to the mixing device 108.

The calcination furnace exhaust-gas discharge passage 111 is different from the kiln exhaust-gas discharge passages 106a to 106e configured to discharge the exhaust gas generated in the rotary kiln 103. When the calcination furnace exhaust-gas discharge passage 111 and the kiln exhaust-gas discharge passages 106a to 106e are defined completely separately, only the carbon dioxide gas-containing exhaust gas having a high carbon dioxide gas concentration can be recovered.

The carbon dioxide gas-containing exhaust gas has a high carbon dioxide gas concentration and a small amount of, for example, nitrogen. Thus, a facility such as the methane generator 112 can be downsized. In addition, the carbon dioxide gas-containing exhaust gas is suitable as a raw material for generation of methane. Because of a high temperature of the carbon dioxide gas-containing exhaust gas, there can be reduced an amount of heat supplied from an outside, which is required to set a temperature in the methane generator 112 within a temperature range (for example, from 200° C. to 800° C.) suitable for the generation of methane.

The carbon dioxide gas concentration of the carbon dioxide gas-containing exhaust gas is preferably 80% by volume or higher, more preferably 85% by volume or higher, particularly preferably 90% by volume or higher to a volume of 100% by volume, excluding steam.

The carbon dioxide gas concentration can be obtained by adjusting an oxygen concentration of the combustion-supporting gas. More specifically, the carbon dioxide gas concentration can be increased by increasing the oxygen concentration of the combustion-supporting gas or by reducing a concentration of a gas (for example, nitrogen) other than oxygen, a carbon dioxide gas, and steam in the combustion-supporting gas.

The temperature of the carbon dioxide gas-containing exhaust gas differs depending on conditions of decarbonation in the calcination furnace 104 and generally falls within a range of from 700° C. to 900° C. The carbon dioxide gas-containing exhaust gas has a high temperature. Thus, steam may be generated by heating water with the exhaust gas so that electric power is generated with use of the steam and a steam turbine.

The mixing device 108 is configured to mix the carbon dioxide gas-containing exhaust gas and a hydrogen gas so as to prepare a gas mixture of the carbon dioxide gas-containing exhaust gas and the hydrogen gas and adjust a temperature of the gas mixture.

When the preparation of a mixing ratio of the carbon dioxide gas-containing exhaust gas and the hydrogen gas and the adjustment of the temperature of the gas mixture are suitably performed in the mixing device 108, methane can be more efficiently generated in the methane generator 112 (described later in detail).

The hydrogen gas to be used in the mixing device 108 is supplied from the hydrogen-gas supply device (water electrolysis device 109 in FIG. 2) to the mixing device 108 through the hydrogen-gas supply passage 110 configured to guide the hydrogen gas to the mixing device 108.

Any hydrogen-gas supply device that can supply a hydrogen gas may be used. Examples of the hydrogen-gas supply device include a hydrogen-gas cylinder, a hydrogen-gas storage tank, and a water electrolysis device such as an alkaline water electrolysis device, a solid polymer water electrolysis device, and a steam electrolysis device.

Among the above-mentioned devices, for construction of an efficient cement clinker producing system, the water electrolysis device that electrolyzes water to provide a hydrogen gas and an oxygen gas is preferred.

When the steam electrolysis device is used, for example, steam generated in the methane generator 112 or steam generated in a heat exchanging device that is suitably provided in the cement clinker producing system can be used as a raw material.

When the water electrolysis device 109 is used as the hydrogen-gas supply device, an oxygen gas is generated together with the hydrogen gas. The oxygen gas may be used as an oxygen gas to be contained in the combustion-supporting gas. In this case, the water electrolysis device 109 also serves as the combustion-supporting gas supply device. The oxygen gas generated in the water electrolysis device 109 is supplied to the combustion-supporting gas supply passage 107.

A hydrogen-gas supply device such as a hydrogen-gas tank may be provided independently of the water electrolysis device so that a hydrogen gas is separately supplied from the hydrogen-gas supply device to the hydrogen-gas supply passage 110.

When electrical energy derived from renewable energy such as water power, wind power, geothermal heat, or sunlight or electric power generated by using methane generated in the methane generator 112 as fuel is used as electrical energy for electrolyzing water, the emission amount of carbon dioxide can be further reduced.

The carbon dioxide gas-containing exhaust gas generated in the calcination furnace 104 contains a trace amount of oxygen gas. When the carbon dioxide gas-containing exhaust gas and a hydrogen gas are mixed in the mixing device 108, the oxygen gas reacts with the hydrogen gas to turn into steam.

The gas mixture is prepared in the mixing device 108 so that a volume ratio of the hydrogen gas and the carbon dioxide gas (hydrogen gas/carbon dioxide gas) in the gas mixture after occurrence of the reaction between the oxygen gas and the hydrogen gas falls within a range of preferably from 3.8 to 4.5, more preferably from 3.9 to 4.2. The gas mixture is generally prepared while a supply amount of hydrogen gas from the hydrogen-gas supply passage 110 is increased or decreased.

When the above-mentioned ratio is 3.8 or larger, the amount of carbon dioxide gas (unreacted carbon dioxide remaining in the methane generator 112) contained in a methane-containing gas is reduced. As a result, a larger amount of methane can be generated.

When the above-mentioned ratio is 4.5 or smaller, the amount of hydrogen gas (unreacted hydrogen remaining in the methane generator 112) in a gas containing methane generated in the methane generator 112 (hereinafter referred to as "methane-containing gas") is reduced. As a result, when the methane-containing gas is used as fuel, difficulty in temperature control and generation of NOx can be prevented.

The temperature of the gas mixture falls within a range of preferably from 200° C. to 600° C., more preferably from 220° C. to 500° C., further preferably from 240° C. to 400° C., particularly preferably from 250° C. to 300° C. When the temperature of the gas mixture is 200° C. or higher, efficiency in the generation of methane in the methane generator 112 can be improved. A temperature of the hydrogen gas to be mixed is generally a room temperature (20° C.). Thus, it is difficult to obtain a gas mixture having the temperature exceeding 600° C. When the temperature is 600° C. or lower, a load on facilities such as the mixing device 108 and the gas-mixture supply passage 113 can be reduced.

The gas mixture may be heated or cooled in the mixing device 108 so that the temperature of the gas mixture falls within the above-mentioned numerical range.

The gas mixture obtained through mixing in the mixing device 108 is supplied to the methane generator 112 through the gas-mixture supply passage 113 configured to guide the gas mixture from the mixing device 108 to the methane generator 112.

When the gas mixture has a high soot and dust concentration, a cyclone collector, a bag filter, or an electric dust collector may be provided in the gas-mixture supply passage 113 so as to recover soot and dust for more efficient generation of methane and reduction of a load on the methane generator 112. The soot and dust concentration of the gas mixture is preferably 1 $g/m^3N$ or lower, more preferably 0.5 $g/m^3$ N or lower.

A methanation inhibitory component separator may be provided in the gas-mixture supply passage 113. The methanation inhibitory component separator separates an inhibitory component (component that inhibits an action of a catalyst and lowers performance as a catalyst) to a catalyst used in the methane generator 112.

Examples of the inhibitory component include a sulfur oxide (SOx), a nitrogen oxide (NOx), and hydrogen chloride (HCl). An appropriate combination of known methods and devices that remove the inhibitory component such as a sulfur oxide, a nitrogen oxide, or hydrogen chloride may be used as the methanation inhibitory component separator.

Water (steam) may be removed in the methanation inhibitory component separator as needed.

Nitrogen ($N_2$) in the carbon dioxide gas-containing exhaust gas is an unnecessary gas that does not contribute to the generation of methane. Thus, for efficient generation of methane, nitrogen may be removed from the gas mixture.

The methane generator 112 is configured to generate methane and steam through a reaction caused through use of a catalyst between a carbon dioxide gas and a hydrogen gas contained in the gas mixture.

The catalyst and a carrier that may be used to support the catalyst are the same as a catalyst and a carrier that are used in the methanation described above.

A temperature of an internal space (space in which a carbon dioxide gas and a hydrogen gas react to generate methane) of the methane generator 112 falls within a range of preferably from 200° C. to 800° C., more preferably from 250° C. to 700° C.

A reaction in which methane is generated from a carbon dioxide gas and a hydrogen gas through use of a catalyst (so-called "methanation reaction") is an exothermic reaction. The methanation reaction does not proceed without a predetermined or higher level of energy. In the present invention, a high-temperature carbon dioxide gas-containing exhaust gas generated in the calcination furnace 104 is used to adjust the temperature of the gas mixture in the mixing device 108. Thus, the temperature of the internal space of the methane generator 112 can easily be set to fall within the above-mentioned temperature range.

Thermal energy may be supplied from an outside for the purpose of promoting the above-mentioned reaction. For example, a heating means may be disposed around the methane generator 112 so as to indirectly heat the internal space of the methane generator 112.

When the temperature of the internal space exceeds 800° C. as a result of an exothermic reaction, the methanation reaction may suddenly become slow. In this case, refrigerant may be loaded so as to perform cooling. Heat that is recovered with use of refrigerant may be used to, for example, generate electric power.

The methane generator 112 is not limited to a particular one as long as a catalyst can be supplied to an internal space of a methane generator so as to cause a methanation reaction. For example, a fixed-bed reaction furnace can be used.

Methane and steam that are generated in the methane generator 112 are discharged as a methane-containing gas containing, for example, the methane, the steam, and remaining unreacted carbon-dioxide gas and hydrogen gas.

The methane-containing gas may be supplied to the calcination furnace 104 through a methane supply passage 114 so as to reduce the emission amount of carbon dioxide in the cement clinker manufacture and reduce cost for fuel. Methane contained in the methane-containing gas supplied to the calcination furnace 104 is used as fuel for the heating means 115a of the calcination furnace 104.

The methane-containing gas supplied to the calcination furnace 104 may contain the steam generated in the methane generator 112. When the methane-containing gas contains the steam, a carbon dioxide partial pressure in the calcination furnace 104 decreases. As a result, decarbonation is enabled at a temperature lower by 10° C. to 50° C. than a temperature used in a case in which a methane-containing gas without steam is supplied.

For an increase in the amount of heat generation from the methane-containing gas, steam may be removed from the methane-containing gas.

The methane-containing gas to be supplied to the calcination furnace 104 may contain an unreacted hydrogen gas remaining in the methane generator 112. The hydrogen gas can be used as fuel for the heating means 115a of the calcination furnace 104.

When a ratio of the hydrogen gas in the methane-containing gas exceeds 15% by mass, it becomes difficult to control the temperature of the calcination furnace 104, bringing about a problem such as generation of NOx. Thus, a heating means that is suitable for using hydrogen as fuel may be needed.

The methane-containing gas may be supplied to a heating means 115b for the rotary kiln 103 so as to be used as fuel for the heating means 115b.

The methane-containing gas has a high temperature (for example, 200° C. to 800° C.). When the methane-containing gas is supplied to the calcination furnace 104 or the rotary kiln 103 while maintaining a high temperature, a temperature in the calcination furnace 104 or the rotary kiln 103 can be raised to a desired temperature with a smaller amount of the methane-containing gas as compared with a case in which a methane-containing gas having a room temperature is supplied.

Methane generated in the methane generator 112 may be separately used as fuel for electric power generation.

A cement clinker producing system 201 illustrated in FIG. 3 includes a cyclone preheater 202, a rotary kiln 203, a calcination furnace 204, a clinker cooler 205, a kiln exhaust-gas discharge passage 206, a combustion-supporting gas supply device 208, a combustion-supporting gas supply passage 209, a calcination furnace exhaust-gas discharge passage 210 (that should be different from the kiln exhaust-gas discharge passage 206), a preheated raw-material supply passage 207, a first recovery means 211a, and a calcination furnace exhaust-gas supply passage 219. The cyclone preheater 202 is configured to preheat a cement clinker raw material. The rotary kiln 203 is configured to burn the cement clinker raw material preheated in the cyclone preheater 202 to provide cement clinker. The calcination furnace 204 is disposed together with the cyclone preheater 202 on a front stream side of the rotary kiln 203 and is configured to promote decarbonation of the cement clinker raw material. The clinker cooler 205 is disposed on a rear stream side of the rotary kiln 203 and is configured to cool the cement clinker. The kiln exhaust-gas discharge passage 206 is configured to discharge an exhaust gas generated in the rotary kiln 203 after the exhaust gas passes through the cyclone preheater 202. The combustion-supporting gas supply device 208 is configured to supply a combustion-supporting gas having a higher oxygen concentration than that of air. The combustion-supporting gas supply passage 209 is configured to guide the combustion-supporting gas from the combustion-supporting gas supply device 208 to the calcination furnace 204. The calcination furnace exhaust-gas discharge passage 210 is configured to discharge a carbon dioxide gas-containing exhaust gas generated in the calcination furnace 204. The preheated raw-material supply passage 207 is configured to supply the preheated cement clinker raw material from the cyclone preheater 202 to the calcination furnace 204. The first recovery means 211a is disposed in the calcination furnace exhaust-gas discharge passage 210 and is configured to recover a quicklime-containing raw material from the carbon dioxide gas-containing exhaust gas. The calcination furnace exhaust-gas supply passage 219 is coupled to the calcination furnace exhaust-gas discharge passage 210 at a position on a rear stream side of the first recovery means 211a in the calcination furnace exhaust-gas discharge passage 210, and is configured to merge a part of the carbon dioxide gas-containing exhaust gas flowing through the calcination furnace exhaust-gas discharge passage 210 into the combustion-supporting gas flowing through the combustion-supporting gas supply passage 209.

The cyclone preheater 202 includes two or more cyclone heat exchangers. The calcination furnace 204 includes a heating means 221 and is configured to promote decarbonation of the cement clinker raw material with use of the heating means 221. The combustion-supporting gas supply passage 209 allows heat exchange between the carbon dioxide gas-containing exhaust gas flowing through the calcination furnace exhaust-gas discharge passage 210 and the combustion-supporting gas at a position on a front stream side of the first recovery means 211a in the calcination furnace exhaust-gas discharge passage 210.

The cyclone preheater 202 is the same as the above-mentioned cyclone preheater 2.

The preheated raw-material supply passage 207 is coupled to a cyclone heat exchanger 202c in the two or more cyclone heat exchangers 202a to 202d of the cyclone preheater 202. In the cyclone heat exchanger 202c, the cement clinker raw material is preheated at a temperature falling within a range of preferably from 550° C. to 850° C., more preferably from 600° C. to 750° C. The preheating at a temperature falling within the above-mentioned temperature range further facilitates fixation (carbonation) of a carbon dioxide gas contained in a kiln exhaust gas into a quicklime-containing raw material (described later in detail) loaded into the cyclone preheater 202 from a quicklime-containing raw material supply passage 218 when the kiln exhaust gas passes through the cyclone preheater 202 (in particular, the cyclone heat exchanger 202c to which the preheated raw-material supply passage 207 is coupled). As a result, the amount of carbon dioxide gas in the kiln exhaust gas can be reduced, and a concentration of the carbon dioxide gas in the carbon dioxide gas-containing exhaust gas can be further increased.

The cement clinker raw material loaded into the cyclone preheater 202 is the same as the cement clinker raw material loaded into the cyclone preheater 2 described above.

The preheated cement clinker raw material is supplied to the calcination furnace 204 from the preheated raw-material supply passage 207 coupled to any one of the two or more cyclone heat exchangers 202a to 202d of the cyclone preheater 202.

In FIG. 3, the preheated raw-material supply passage 207 is coupled to the second cyclone heat exchanger 202c or a subsequent one from a rearmost stream side in the cyclone preheater 202. The cement clinker raw material that has been preheated through the cyclone heat exchangers 202a to 202c passes from the cyclone heat exchanger 202c through the preheated raw-material supply passage 207 and is loaded into the calcination furnace 204. When the preheated raw-material supply passage 207 is coupled to the second cyclone heat exchanger 202c from the rearmost stream side, a sufficiently preheated cement clinker raw material can be loaded into the calcination furnace 204.

The calcination furnace 204 is disposed together with the cyclone preheater 202 on a front stream side of the rotary kiln 203 for the purpose of promoting the decarbonation of the cement clinker raw material through combustion of fuel with use of the heating means 221.

A temperature at which the cement clinker raw material is heated in the calcination furnace 204 falls within a range of preferably from 850° C. to 1,100° C., more preferably from 880° C. to 1,050° C., particularly preferably from 900° C. to 1,000° C. When the temperature is 850° C. or higher, the decarbonation of the cement clinker raw material can be further promoted even under an atmosphere in which a carbon dioxide partial pressure is high. In addition, even when a decarbonated cement clinker raw material passes from the calcination furnace 204 through a first decarbonated raw-material supply passage 212 and is directly loaded into the rotary kiln 203, a temperature in the rotary kiln 203 is not excessively decreased. When the temperature is 1,100° C. or lower, clogging due to, for example, sintering of the raw material can be prevented.

The decarbonation of the cement clinker raw material is promoted by combusting fuel with the combustion-supporting gas with use of the heating means 221 so as to directly heat the cement clinker raw material in the calcination furnace 204.

Examples of the heating means 221 include a burner.

The fuel and the combustion-supporting gas that are used in the calcination furnace 204 are the same as the fuel and the combustion-supporting gas that are used in the calcination furnace 4 described above.

The combustion-supporting gas used in the calcination furnace 204 is supplied from the combustion-supporting gas supply device 208 and is guided to the calcination furnace 204 through the combustion-supporting gas supply passage 209.

The combustion-supporting gas supply passage 209 is defined so as to allow heat exchange between the carbon dioxide gas-containing exhaust gas flowing through the calcination furnace exhaust-gas discharge passage 210 and the combustion-supporting gas at a position on a front stream side of the first recovery means 211a described later in the calcination furnace exhaust-gas discharge passage 210.

When the combustion-supporting gas supply passage 209 is defined as described above, the combustion-supporting gas flowing through the combustion-supporting gas supply passage 209 is indirectly heated and has an increased temperature. As a result, a loading amount of fuel to be used in the calcination furnace 204 can be reduced. When a temperature of the carbon dioxide gas-containing exhaust gas flowing through the calcination furnace exhaust-gas discharge passage 210 is decreased, efficiency of recovering a quicklime-containing raw material (fine powder that contains quicklime) from the carbon dioxide gas-containing exhaust gas by the first recovery means 211a can be improved.

The combustion-supporting gas supply passage 209 may be defined so that the combustion-supporting gas passing through the combustion-supporting gas supply passage 209 is indirectly heated and a temperature of the combustion-supporting gas is raised with air having a temperature raised through the heat exchange with the cement clinker in the clinker cooler 205. The temperature of the combustion-supporting gas may be raised with heat of the cement clinker by defining the combustion-supporting gas supply passage 209 passing through a part on a rear stream side of a cement cooler (outlet side of the clinker cooler).

A loading amount of fuel used in the calcination furnace 204 can be reduced by raising the temperature of the combustion-supporting gas.

The combustion-supporting gas supply device 208 is the same as the above-mentioned combustion-supporting gas supply device 7.

The combustion-supporting gas supplied from the combustion-supporting gas supply device 208 has a higher oxygen concentration than that of air.

For preventing combustion control from becoming difficult due to an excessive increase in the oxygen concentration of the combustion-supporting gas used in the calcination furnace 204, further increasing the carbon dioxide gas concentration of the carbon dioxide gas-containing exhaust gas, and reducing the amount of oxygen remaining in the carbon dioxide gas-containing exhaust gas, the combustion-supporting gas to be supplied to the calcination furnace 204 is a gas mixture obtained by mixing the combustion-supporting gas supplied from the combustion-supporting gas supply device 208 and a carbon dioxide gas.

The carbon dioxide gas is supplied by the calcination furnace exhaust-gas supply passage 219 described later.

For the purpose of reducing the carbon dioxide partial pressure and thereby decreasing a temperature required to promote decarbonation, a gas mixture obtained by mixing the combustion-supporting gas supplied from the combustion-supporting gas supply device 208 and steam may be used as the combustion-supporting gas to be used in the calcination furnace 204.

A carbon dioxide gas concentration of the above-mentioned gas mixture (mixture of the combustion-supporting gas supplied from the combustion-supporting gas supply device 208 and at least one of a carbon dioxide gas or steam) falls within a range of preferably from 10% by volume to 79% by volume, more preferably from 20% by volume to 75% by volume, further preferably from 30% by volume to 70% by volume to a volume of 100% by volume, including steam.

For further reduction in the volume of the carbon dioxide gas-containing exhaust gas generated in the calcination furnace 204 and a further increase in the carbon dioxide gas concentration of the carbon dioxide gas-containing exhaust gas, it is preferred that the combustion-supporting gas used in the calcination furnace 204 do not contain a gas (for example, nitrogen) other than oxygen, a carbon dioxide gas, and steam. A concentration of a gas other than oxygen, a carbon dioxide gas, and steam in the combustion-supporting gas is preferably 10% by volume or lower, more preferably 5% by volume or lower, particularly preferably 2% by volume or lower to a volume of 100% by volume, including steam.

The carbon dioxide gas-containing exhaust gas generated in the calcination furnace 204 is discharged through the calcination furnace exhaust-gas discharge passage 210.

The first recovery means 211a is disposed in the calcination furnace exhaust-gas discharge passage 210. The first recovery means 211a recovers the quicklime-containing raw material (fine powder that contains quicklime) contained in the carbon dioxide gas-containing exhaust gas from the carbon dioxide gas-containing exhaust gas flowing through the calcination furnace exhaust-gas discharge passage 210.

Examples of the first recovery means 211a include a cyclone collector, a bag filter, and an electric dust collector.

The quicklime-containing raw material recovered by the first recovery means 211a may be supplied from the first recovery means 211a through a quicklime-containing raw material supply passage 218a to the cyclone preheater 202 for the purpose of fixation (carbonation) of the carbon dioxide gas in the kiln exhaust gas into the quicklime-containing raw material.

In FIG. 3, the quicklime-containing raw material supply passage 218a communicates with the quicklime-containing raw material supply passage 218.

The calcination furnace exhaust-gas supply passage 219 is defined at a position on a rear stream side of the first recovery means 211a in the calcination furnace exhaust-gas discharge passage 210. The calcination furnace exhaust-gas supply passage 219 is coupled to the calcination furnace exhaust-gas discharge passage 210 and is configured to merge a part of the carbon dioxide gas-containing exhaust gas flowing through the calcination furnace exhaust-gas discharge passage 210 into the combustion-supporting gas flowing through the combustion-supporting gas supply passage 209.

When a part of the carbon dioxide gas-containing exhaust gas is used as a part of the combustion-supporting gas and is circulated, the amount of exhaust gas that is discharged ultimately from the calcination furnace exhaust-gas discharge passage 210 to an outside can be reduced. A circulating amount of the carbon dioxide gas-containing exhaust gas flowing through the calcination furnace exhaust-gas discharge passage 210, which is used as a part of the combustion-supporting gas, preferably falls within a range of from 50% by volume to 70% by volume.

Dust containing quicklime (quicklime-containing raw material) has been recovered by the first recovery means 211a from the carbon dioxide gas-containing exhaust gas flowing from the calcination furnace exhaust-gas supply passage 219, which is to be merged with the combustion-supporting gas flowing through the combustion-supporting gas supply passage 209. Thus, for example, accumulation and adhesion of the dust and adverse effects on the combustion of fuel in the calcination furnace 204 and adverse effects on heat exchange between the carbon dioxide gas-containing exhaust gas and the combustion-supporting gas in the calcination furnace exhaust-gas discharge passage 210, which are caused by accumulation and adhesion of the dust, can be reduced.

Water is further removed, and a carbon dioxide gas is then separated and recovered from the carbon dioxide gas-containing exhaust gas, from which the quicklime-containing raw material has been recovered by the first recovery means 211a.

The calcination furnace exhaust-gas discharge passage 210 is different from kiln exhaust-gas discharge passages 206a to 206e configured to discharge the exhaust gas generated in the rotary kiln 203. The calcination furnace exhaust-gas discharge passage 210 and the kiln exhaust-gas discharge passages 206a to 206e are defined completely separately. As a result, only the carbon dioxide gas-containing exhaust gas having a high carbon dioxide gas concentration can be recovered.

The carbon dioxide gas-containing exhaust gas generated in the calcination furnace 204 has a high carbon dioxide gas concentration. Thus, it is easy to separate and recover a carbon dioxide gas from the carbon dioxide gas-containing exhaust gas. The carbon dioxide gas concentration of the carbon dioxide gas-containing exhaust gas is preferably 80% by volume or higher, more preferably 85% by volume or higher, particularly preferably 90% by volume or higher to a volume of 100% by volume, excluding steam.

The above-mentioned carbon dioxide gas concentration can be obtained by adjusting an oxygen concentration of the combustion-supporting gas. More specifically, the carbon dioxide gas concentration can be increased by increasing the oxygen concentration of the combustion-supporting gas or reducing a concentration of a gas (for example, nitrogen) other than oxygen, a carbon dioxide gas, and steam in the combustion-supporting gas.

The temperature of the carbon dioxide gas-containing exhaust gas discharged from the calcination furnace 204 generally falls within a range of from 950° C. to 1,100° C. The carbon dioxide gas-containing exhaust gas has a high temperature. Thus, steam may be generated by heating water with the exhaust gas so that electric power is generated with use of the steam and a steam turbine.

The carbon dioxide gas may be purified by removing, for example, oxygen, nitrogen, and steam from the carbon dioxide gas-containing exhaust gas. When the carbon dioxide gas-containing exhaust gas has a high concentration of carbon dioxide gas, the carbon dioxide gas can be purified by liquification through direct compression and cooling without being separated and recovered with use of a chemical absorbent such as amine.

A calcination furnace exhaust-gas temperature reducing device (not shown) may be disposed in the calcination furnace exhaust-gas discharge passage 210 so as to be located on a front stream side of the first recovery means 211a. The calcination furnace exhaust-gas temperature reducing device reduces a temperature of the carbon dioxide gas-containing exhaust gas flowing through the calcination furnace exhaust-gas discharge passage 210. The calcination furnace exhaust-gas temperature reducing device is not limited to a particular one as long as the temperature of the carbon dioxide gas-containing exhaust gas can be reduced. For example, examples of the calcination furnace exhaust-gas temperature reducing device include a device that allows heat exchange between air and the carbon dioxide gas-containing exhaust gas and a device that allows heat exchange between liquid and the carbon dioxide gas-containing exhaust gas.

When the temperature of the carbon dioxide gas-containing exhaust gas is reduced to, for example, 100° C. to 400° C., the fine powder containing quicklime in the carbon dioxide gas-containing exhaust gas can be more efficiently recovered by the first recovery means 211a. Adverse effects on various devices, which may be produced due to a high temperature of the carbon dioxide gas-containing exhaust gas, can be reduced.

A fuel conveying gas supply passage 220 may be defined. The fuel carrying gas supply passage 220 branches from at least one of a position in the combustion-supporting gas supply passage 209, which is closer to the combustion-supporting gas supply device 208 than a portion at which the carbon dioxide gas-containing exhaust gas and the combustion-supporting gas are allowed to exchange heat, or a position (not shown) in the calcination furnace exhaust-gas supply passage 219. The fuel carrying gas supply passage 220 is configured to supply a fuel conveying gas to the heating means 221 of the calcination furnace 204. The fuel carrying gas supply passage 220 may be coupled to the heating means 221.

The fuel carrying gas is a gas to be used for carrying a solid fuel such as coal or biomass or a liquid fuel such as a heavy oil to the heating means 221 provided in the calcination furnace 204.

The combustion-supporting gas (combustion-supporting gas having a relatively low temperature before exchanging heat with the carbon dioxide gas-containing exhaust gas having a high temperature discharged from the calcination furnace 204) flowing through the combustion-supporting gas supply passage 209 or the carbon dioxide gas-containing exhaust gas flowing through the calcination furnace exhaust-gas supply passage 219 may be directly used as the fuel carrying gas but may also be appropriately mixed with a carbon dioxide gas or oxygen. A temperature of the fuel carrying gas may be appropriately adjusted.

The use of the fuel carrying gas can further increase a carbon dioxide gas concentration of the carbon dioxide gas-containing exhaust gas discharged from the calcination furnace exhaust-gas discharge passage 210 and further reduce a volume of the carbon dioxide gas-containing exhaust gas.

A fuel supply device (not shown) that supplies fuel to the fuel carrying gas flowing through the fuel carrying gas supply passage 220 may be provided in the fuel carrying gas supply passage 220.

In FIG. 3, after decarbonation is promoted in the calcination furnace 204, the cement clinker raw material passes through the first decarbonated raw-material supply passage 212 and is supplied to the rotary kiln 203 while maintaining a high temperature achieved by heating.

A second recovery means 211b may be disposed in the first decarbonated raw-material supply passage 212. The second recovery means 211b recovers a part of the decarbonated cement clinker raw material flowing through the first decarbonated raw-material supply passage 212 as a quicklime-containing raw material.

The quicklime-containing raw material recovered by the second recovery means 211b passes from the second recovery means 211b through a second quicklime-containing raw material supply passage 218b, is merged into the quicklime-containing raw material flowing through the quicklime-containing raw material supply passage 218a, and is supplied to the cyclone preheater 202 for the purpose of fixing (carbonating) the carbon dioxide gas in the kiln exhaust gas into the quicklime-containing raw material.

The second quicklime-containing raw material supply passage 218b is coupled to the quicklime-containing raw material supply passage 218a (not shown). In FIG. 3, the quicklime-containing raw material supply passage 218a communicates with the quicklime-containing raw material supply passage 218.

After the decarbonation is promoted in the calcination furnace 204, the quicklime-containing raw material may be supplied to the cyclone heat exchanger on the rearmost stream side while maintaining a high temperature achieved by heating (not shown).

The quicklime-containing raw material (fine powder that contains quicklime or decarbonated cement clinker raw material that contains quicklime) recovered by the first recovery means 211a and the second recovery means 211b, which are described above, passes through the quicklime-containing raw material supply passage 218 and is supplied to the cyclone heat exchanger 202c to which the preheated raw-material supply passage 207 is coupled or any of the cyclone heat exchangers 202a and 202b located on a front stream side of the cyclone heat exchanger in two or more cyclone heat exchangers 202a to 202d of the cyclone preheater 202.

When the quicklime-containing raw material is supplied to the cyclone heat exchanger 202c to which the preheated raw-material supply passage 207 is coupled or any of the cyclone heat exchangers 202a and 202b located on the front stream side of the cyclone heat exchanger, the carbon dioxide gas contained in the kiln exhaust gas is fixed (carbonated) into the quicklime-containing raw material when the kiln exhaust gas flowing through the kiln exhaust-gas discharge passage 210 passes through the cyclone preheater 202. As a result, the amount of carbon dioxide gas ($CO_2$) contained in the kiln exhaust gas discharged from the kiln exhaust-gas discharge passage can be reduced.

After being loaded together with another cement clinker raw material into the calcination furnace 204, carbon dioxide fixed into the quicklime-containing raw material is decarbonated in the calcination furnace and can be recovered as a carbon dioxide gas-containing exhaust gas.

A second decarbonated raw-material supply passage 213 is coupled to the first decarbonated raw-material supply passage 212 and is configured to supply a part of the decarbonated cement clinker raw material from the first decarbonated raw-material supply passage 212 to the cyclone heat exchanger 202d, which is located on a rearmost stream side in two or more cyclone heat exchangers of the cyclone preheater 202.

The decarbonated cement clinker raw material flowing through the first decarbonated raw-material supply passage 212 has a high temperature (for example, from 950° C. to 1,000° C.) Thus, when the raw material is supplied to the cyclone heat exchanger 202d that is located on the rearmost stream side, the temperature in the cyclone preheater 202 can be further increased so as to more effectively preheat the cement clinker raw material or fix (carbonate) the carbon dioxide gas contained in the kiln exhaust gas.

The cement clinker raw material supplied to the cyclone heat exchanger 202d is centrifuged while exchanging heat with the kiln exhaust gas passing through the cyclone heat exchanger 202d. After that, the cement clinker raw material is loaded into the rotary kiln 203.

A part of the second decarbonated raw-material supply passage 213 may serve as the kiln exhaust-gas discharge passage 206.

A decarbonated raw-material supply amount controller 215 is configured to adjust a temperature in the cyclone heat exchanger 202c coupled to the preheated raw-material supply passage 207 by adjusting the amount of decarbonated cement clinker raw material supplied from the second decarbonated raw-material supply passage 213 to the cyclone heat exchanger 202d located on the rearmost stream side and adjusting a temperature in the cyclone heat exchanger 202d and a temperature of the kiln exhaust gas passing through the cyclone heat exchanger 202d through the adjustment of the amount of raw material.

The amount of raw material is adjusted based on a temperature of the kiln exhaust gas in the kiln exhaust-gas discharge passage 206 when the kiln exhaust gas passes through the cyclone heat exchanger 202c coupled to the preheated raw-material supply passage 207.

The temperature may be a temperature in the vicinity of an inlet (position at which the kiln exhaust gas flows into the cyclone heat exchanger 202c) of the kiln exhaust-gas discharge passage 206 passing through the cyclone heat exchanger 202c coupled to the preheated raw-material supply passage 207 or a temperature in the vicinity of an outlet (position at which the kiln exhaust gas flows out of the cyclone heat exchanger 202c) of the kiln exhaust-gas discharge passage 206.

The temperature is measured by a temperature measurement device 214. It is only required that the temperature measurement device 214 be appropriately disposed in the cyclone heat exchanger 202c coupled to the preheated raw-material supply passage 207.

A water supply device (not shown) may be disposed for the purpose of adjusting the temperature in the cyclone heat exchanger 202c coupled to the preheated raw-material supply passage 207. The water supply device is configured to supply water or a water-containing waste to an exhaust gas flowing through the kiln exhaust-gas discharge passage 206 when the exhaust gas passes through a part of the kiln exhaust-gas discharge passage 206a (surrounded by the alternate long and short dash line in FIG. 3), which extends from a portion coupled to the rotary kiln 203 to a portion on a front stream side of the cyclone heat exchanger 202d located on the rearmost stream side. When water or a water-containing waste is supplied to the exhaust gas, the temperature is adjusted. It is only required that the adjustment be performed based on the temperature measured by the temperature measurement device 214, or the adjustment may be performed in association with the decarbonated raw-material supply amount controller 215.

An air supply passage 217 may be defined. The air supply passage 217 is configured to guide air in the clinker cooler 205 from the clinker cooler 205 into the kiln exhaust-gas discharge passage 206a. The air has a temperature raised through heat exchange with the cement clinker in the clinker cooler 205. The temperature and the amount of the kiln exhaust gas in the kiln exhaust-gas discharge passage 206 can be adjusted by adjusting the amount of the air supplied from the air supply passage 217 to the kiln exhaust-gas discharge passage 206a. Thus, incomplete combustion of the waste loaded into a kiln bottom portion can be prevented.

It is only required that the amount of air be adjusted based on the temperature measured by the temperature measurement device 214, or the amount of air may be adjusted in association with the decarbonated raw-material supply amount controller 215.

Fuel used in the rotary kiln 203 is the same as the fuel used in the rotary kiln 3 and the rotary kiln 103, which are described above.

The exhaust gas generated in the rotary kiln 203 flows through the kiln exhaust-gas discharge passages 206a to 206e configured to discharge the exhaust gas having passed through the cyclone preheater 202. Then, after the exhaust gas is discharged from a top of the cyclone preheater 202 and dust is removed from the exhaust gas with use of a cyclone collector, a bag filter, or an electric dust collector, the exhaust gas is discharged to an outside through a chimney.

A denitrating-agent supply device (not shown) may be disposed. The denitrating-agent supply device is configured to supply a denitrating agent to the exhaust gas flowing through the kiln exhaust-gas discharge passage 206 when the exhaust gas passes through a part of the kiln exhaust-gas discharge passage 206 (surrounded by the alternate long and short dash line in FIG. 3), which extends from a portion coupled to the rotary kiln 203 to a portion on a front stream side of the cyclone heat exchanger 202d located on the rearmost stream side. When a denitrating agent such as urea is sprayed into the exhaust gas, NOx in the exhaust gas can be reduced.

Effects of reducing NOx in the exhaust gas can generally be obtained by spraying a denitrating agent into the exhaust gas at a temperature of about 900° C. In a typical cement clinker producing system, the temperature of the exhaust gas is about 900° C. in a region extending from a kiln bottom of a rotary kiln to a bottom cyclone (cyclone heat exchanger located on a rearmost stream side). There is a large amount of fine powder derived from the cement clinker raw material in the region. Thus, there may arise a problem in that the effects are reduced due to adsorption of the sprayed denitrating agent to the fine powder.

Meanwhile, with the cement clinker producing system 201 of FIG. 3, the amount of fine powder derived from the cement clinker raw material in the exhaust gas when the exhaust gas passes through the region (extending from the portion of the kiln exhaust-gas discharge passage 206, which is coupled to the rotary kiln 203, to the cyclone heat exchanger 202d located on the rearmost stream side) can be reduced. Thus, the amount of NOx in the exhaust gas can be efficiently reduced.

A carbon dioxide gas may be separated and recovered from the kiln exhaust gas, independently of the reduction in carbon dioxide gas contained in the kiln exhaust gas, which is caused by supplying the quicklime-containing raw material described above. Examples of a method of separating and recovering a carbon dioxide gas from the kiln exhaust gas include a chemical absorption technique using, for example, monoethanolamine as a carbon dioxide absorbent, a solid adsorption method, and a membrane separation method.

A chlorine bypass device 216 may be disposed. The chlorine bypass device 216 is the same as the chlorine bypass device 10 described above.

The cement clinker obtained in the rotary kiln 203 is loaded into the clinker cooler 205, which is disposed on a rear stream side of the rotary kiln and is configured to cool the cement clinker, and the cement clinker is cooled. The rotary kiln 203 is the same as the rotary kiln 3 described above.

The carbon dioxide gas-containing exhaust gas generated in the calcination furnace 204 may be recovered by a cement clinker producing method using the cement clinker producing system 201 described above so that the carbon dioxide gas in the exhaust gas is used.

Examples of the use of the carbon dioxide gas include the use of the carbon dioxide gas (such as methanation or carbonation of the calcium-containing waste) in the cement clinker producing system 1 described above.

An example of a method of using the carbon dioxide gas through methanation is now described with reference to FIG. 3.

The calcination furnace exhaust-gas discharge passage 210 is coupled to a mixing device 228 at a position (position farther away from the calcination furnace 204) on a rear stream side of a position at which the first recovery means 211a is disposed and a position at which the calcination furnace exhaust-gas supply passage 219 is coupled. The carbon dioxide gas-containing exhaust gas passes through the calcination furnace exhaust-gas discharge passage 210 and is guided to the mixing device 228.

The mixing device 228, the carbon dioxide gas-containing exhaust gas guided to the mixing device, and preparation of the gas mixture in the mixing device 228 are the same as the mixing device 108, the carbon dioxide gas-containing exhaust gas guided to the mixing device 108, and the preparation of the gas mixture in the mixing device 108, which are described above, respectively.

A hydrogen gas to be used in the mixing device 228 is supplied from a hydrogen-gas supply device (water electrolysis device 225 in FIG. 3) to the mixing device 228 through a hydrogen-gas supply passage 227 configured to guide the hydrogen gas to the mixing device 228.

The hydrogen-gas supply device is the same as the hydrogen-gas supply device used in the cement clinker producing system 101 described above.

When the water electrolysis device 225 is used as the hydrogen-gas supply device, an oxygen gas is generated together with the hydrogen gas. The oxygen gas may be used as an oxygen gas to be contained in the combustion-supporting gas. The oxygen gas generated in the water electrolysis device 225 passes through an oxygen-gas supply passage 226 and is supplied to the combustion-supporting gas supply device 208.

In FIG. 3, the combustion-supporting gas supply device 208 and the water electrolysis device 225 are illustrated as different devices. However, the water electrolysis device 225 may also serve as the combustion-supporting gas supply device.

A hydrogen-gas supply device such as a hydrogen-gas tank may be provided independently of the water electrolysis device so that a hydrogen gas is separately supplied from the hydrogen-gas supply device to the hydrogen-gas supply passage 227.

When electrical energy derived from renewable energy such as water power, wind power, geothermal heat, or sunlight or electric power generated by using methane generated in a methane generator 223 as fuel is used as electrical energy for electrolyzing water, the emission amount of carbon dioxide can be further reduced.

The gas mixture obtained by mixing in the mixing device 228 is supplied to the methane generator 223 through a gas-mixture supply passage 222 configured to guide the gas mixture from the mixing device 228 to the methane generator 223.

The gas-mixture supply passage 222 is the same as the gas-mixture supply passage 113 described above. For example, a cyclone collector, a bag filter, or an electric dust collector, or a methanation inhibitory component separator may be provided in the gas-mixture supply passage 222 as in a case of the gas-mixture supply passage 113.

The methane generator 223 is the same as the methane generator 112 described above.

Methane and steam that are generated in the methane generator 223 are discharged as a methane-containing gas containing, for example, the methane, the steam, and unreacted remaining carbon dioxide gas and hydrogen gas.

For reduction in the emission amount of carbon dioxide and reduction of cost for fuel in the cement clinker manufacture, the methane-containing gas may be supplied to the calcination furnace 204 through a methane supply passage 224. Methane contained in the methane-containing gas supplied to the calcination furnace 204 is used as fuel for the heating means 221 of the calcination furnace 204.

The methane-containing gas supplied to the calcination furnace 204 is the same as the methane-containing gas supplied to the calcination furnace 104 described above.

The methane-containing gas may be supplied to a heating means for the rotary kiln 203 so as to be used as fuel for the heating means.

Methane generated in the methane generator 223 may be separately used as fuel for power generation.

In the methanation or the carbonation of the calcium-containing waste described above, when the carbon dioxide gas-containing exhaust gas is directly used for the methanation or the carbonation of the calcium-containing waste while maintaining a high temperature and without being purified (without separation and removal of the carbon dioxide gas), methanation or carbonation of waste concrete can be more efficiently performed.

In the manufacture of cement clinker using the above-mentioned cement clinker producing system, the carbon dioxide gas-containing exhaust gas generated in the calcination furnace 204 may be directly stored and isolated.

REFERENCE SIGNS LIST 1,101,201 cement clinker producing system
2,102,202 cyclone preheater
2a,2b,2c,2d,102a,102b,102c,102d,202a,202b,202c,202d cyclone heat exchanger
3,103,203 rotary kiln
4,104,204 calcination furnace
5,105,205 clinker cooler
6, 6a, 6b, 6c, 6d, 6e, 106, 106a, 106b, 106c, 106d, 106e, 206, 206a, 20
6b,206c,206d,206e kiln exhaust-gas discharge passage
7,208 combustion-supporting gas supply device
8,107,209 combustion-supporting gas supply passage
9,111,210 calcination furnace exhaust-gas discharge passage
10,117,216 chlorine bypass device
11,118 merging flow passage
12,119,207 preheated raw-material supply passage
108,228 mixing device
109,225 water electrolysis device (combustion-supporting gas supply device, hydrogen-gas supply device)

110,227 hydrogen-gas supply passage
112,223 methane generator
113,222 gas-mixture supply passage
114,224 methane supply passage
13,115a,115b,221 heating means
211a first recovery means
211b second recovery means
212 first decarbonated raw-material supply passage
213 second decarbonated raw-material supply passage
214 temperature measurement device
215 decarbonated raw-material supply amount controller
217 air supply passage
218,218a quicklime-containing raw material supply passage
218b second quicklime-containing raw material supply passage
219 calcination furnace exhaust-gas supply passage
220 fuel carrying gas supply passage
226 oxygen-gas supply passage

The invention claimed is:

1. A cement clinker producing system, comprising:
a cyclone preheater comprising two or more cyclone heat exchangers configured to preheat a cement clinker raw material;
a rotary kiln configured to burn the cement clinker raw material preheated in the cyclone preheater so as to provide cement clinker;
a calcination furnace comprising a heater, which is disposed together with the cyclone preheater on a front stream side of the rotary kiln, and is configured to promote decarbonation of the cement clinker raw material with use of the heater;
a clinker cooler, which is disposed on a rear stream side of the rotary kiln, and is configured to cool the cement clinker;
and a kiln exhaust-gas discharge passage configured to discharge an exhaust gas generated in the rotary kiln after the exhaust gas passes through the cyclone preheater;
a combustion-supporting gas supply configured to supply a combustion-supporting gas having a higher oxygen concentration than an oxygen concentration of air;
a combustion-supporting gas supply passage configured to guide the combustion-supporting gas from the combustion-supporting gas supply to the calcination furnace; and
a calcination furnace exhaust-gas discharge passage, which is different from the kiln exhaust-gas discharge passage, configured to discharge a carbon dioxide gas-containing exhaust gas generated in the calcination furnace;
a preheated raw-material supply passage configured to supply the preheated cement clinker raw material from the cyclone preheater to the calcination furnace;
a first recovery collector, which is disposed in the calcination furnace exhaust-gas discharge passage, and is configured to recover a quicklime-containing raw material from the carbon dioxide gas-containing exhaust gas;
a calcination furnace exhaust-gas supply passage, which is coupled to the calcination furnace exhaust-gas discharge passage at a position on a rear stream side of the first recovery collector in the calcination furnace exhaust-gas discharge passage, and is configured to merge a part of the carbon dioxide gas-containing exhaust gas flowing through the calcination furnace exhaust-gas discharge passage into the combustion-supporting gas flowing through the combustion-supporting gas supply passage; and
a fuel conveying gas supply passage, which branches from at least one of a position in the combustion-supporting gas supply passage, which is closer to the combustion-supporting gas supply than a portion at which the carbon dioxide gas-containing exhaust gas and the combustion-supporting gas are allowed to exchange heat, or a position in the calcination furnace exhaust-gas supply passage, and is configured to supply a fuel conveying gas to the heater of the calcination furnace,
wherein the combustion-supporting gas supply passage is for heat exchange between the carbon dioxide gas-containing exhaust gas flowing through the calcination furnace exhaust-gas discharge passage and the combustion-supporting gas at a position on a front stream side of the first recovery collector in the calcination furnace exhaust-gas discharge passage.

2. The cement clinker producing system according to claim 1, further comprising a chlorine bypass device configured to extract and cool a part of the exhaust gas generated in the rotary kiln without allowing the part of the exhaust gas to pass through the cyclone preheater, remove solids, and then discharge an exhaust gas without the solids and classify the solids into coarse powder and fine powder, wherein the classifying is for using the coarse powder as a part of the cement clinker and recovering the fine powder.

3. The cement clinker producing system according to claim 1, further comprising a merging flow passage configured to merge a part of the carbon dioxide gas-containing exhaust gas flowing through the calcination furnace exhaust-gas discharge passage into the combustion-supporting gas flowing through the combustion-supporting gas supply passage.

4. The cement clinker producing system according to claim 1, further comprising an air supply passage configured to convey air in the clinker cooler from the clinker cooler into the kiln exhaust-gas discharge passage.

5. The cement clinker producing system according to claim 1,
wherein the preheated raw-material supply passage is coupled to any one of second to subsequent cyclone heat exchangers from a rearmost stream side in the two or more cyclone heat exchangers of the cyclone preheater, and
wherein the cement clinker producing system further comprises:
a quicklime-containing raw material supply passage configured to supply the quicklime-containing raw material recovered by the first recovery collector from the first recovery collector to the cyclone heat exchanger coupled to the preheated raw-material supply passage or a cyclone heat exchanger located on a front stream side of the cyclone heat exchanger in the two or more cyclone heat exchangers;
a first decarbonated raw-material supply passage configured to supply the cement clinker raw material decarbonated in the calcination furnace from the calcination furnace to the rotary kiln;
a second decarbonated raw-material supply passage configured to supply a part of the decarbonated cement clinker raw material from the first decarbonated raw-material supply passage to a cyclone heat exchanger located on a rearmost stream side in the two or more cyclone heat exchangers;

a temperature measurement device configured to measure a temperature of the exhaust gas in the kiln exhaust-gas discharge passage when the exhaust gas passes through the cyclone heat exchanger coupled to the preheated raw-material supply passage; and a decarbonated raw-material supply amount controller configured to adjust an amount of the decarbonated cement clinker raw material to be supplied from the second decarbonated raw-material supply passage to the cyclone heat exchanger located on the rearmost stream side based on the temperature measured by the temperature measurement device and adjust a temperature in the cyclone heat exchanger coupled to the preheated raw-material supply passage through the adjustment of the amount of the decarbonated cement clinker raw material.

6. The cement clinker producing system according to claim 5, further comprising a water supply device configured to supply water or a water-containing waste to the exhaust gas flowing through the kiln exhaust-gas discharge passage when the exhaust gas passes through a part of the kiln exhaust-gas discharge passage, the part extending from a portion coupled to the rotary kiln to a portion on a front stream side of the cyclone heat exchanger located on the rearmost stream side.

7. The cement clinker producing system according to claim 5, further comprising a denitrating-agent supply device configured to supply a denitrating agent to the exhaust gas flowing through the kiln exhaust-gas discharge passage when the exhaust gas passes through a part of the kiln exhaust-gas discharge passage, the part extending from a portion coupled to the rotary kiln to a portion on the front stream side of the cyclone heat exchanger located on the rearmost stream side.

8. The cement clinker producing system according to claim 1, further comprising:
   a mixing device configured to mix the carbon dioxide gas-containing exhaust gas and a hydrogen gas to prepare a gas mixture of the carbon dioxide gas-containing exhaust gas and the hydrogen gas and adjust a temperature of the gas mixture;
   a hydrogen-gas supply configured to supply the hydrogen gas;
   a hydrogen-gas supply passage configured to convey the hydrogen gas from the hydrogen-gas supply to the mixing device;
   a methane generator configured to generate methane and steam through a reaction caused with use of a catalyst between a carbon dioxide gas and the hydrogen gas that are contained in the gas mixture; and
   a gas-mixture supply passage configured to convey the gas mixture from the mixing device to the methane generator,
   wherein the calcination furnace exhaust-gas discharge passage is configured to convey the carbon dioxide gas-containing exhaust gas from the calcination furnace to the mixing device.

9. The cement clinker producing system according to claim 8, further comprising a methane supply passage configured to supply a methane-containing gas, which contains the methane generated in the methane generator, to the calcination furnace.

10. The cement clinker producing system according to claim 8, wherein the combustion-supporting gas supply and the hydrogen-gas supply are a water electrolysis device configured to electrolyze water to provide a hydrogen gas and an oxygen gas.

11. A cement clinker producing method for producing cement clinker by using the cement clinker producing system of claim 1, the cement clinker producing method comprising recovering the carbon dioxide gas-containing exhaust gas so as to use a carbon dioxide gas in the carbon dioxide gas-containing exhaust gas.

12. The cement clinker producing method according to claim 11, wherein an oxygen concentration of the combustion-supporting gas is adjusted so that a carbon dioxide gas concentration of the carbon dioxide gas-containing exhaust gas is 80% by volume or higher to a volume of 100% by volume, excluding steam.

13. The cement clinker producing method according to claim 11, further comprising generating methane from a hydrogen gas and the carbon dioxide gas in the recovered carbon dioxide gas-containing exhaust gas through use of a catalyst, and the generated methane using as fuel for at least one of the rotary kiln or the calcination furnace.

14. The cement clinker producing method according to claim 11, further comprising contacting the recovered carbon dioxide gas-containing exhaust gas with a calcium-containing waste so that the carbon dioxide gas contained in the carbon dioxide gas-containing exhaust gas is absorbed by the calcium-containing waste, and using the calcium-containing waste that has absorbed the carbon dioxide gas as a cement clinker raw material.

15. A cement clinker producing system, comprising:
   a cyclone preheater comprising two or more cyclone heat exchangers configured to preheat a cement clinker raw material;
   a rotary kiln configured to burn the cement clinker raw material preheated in the cyclone preheater so as to provide cement clinker;
   a calcination furnace comprising a heater, which is disposed together with the cyclone preheater on a front stream side of the rotary kiln, and is configured to promote decarbonation of the cement clinker raw material with use of the heater;
   a clinker cooler, which is disposed on a rear stream side of the rotary kiln, and is configured to cool the cement clinker;
   and a kiln exhaust-gas discharge passage configured to discharge an exhaust gas generated in the rotary kiln after the exhaust gas passes through the cyclone preheater;
   a combustion-supporting gas supply configured to supply a combustion-supporting gas having a higher oxygen concentration than an oxygen concentration of air;
   a combustion-supporting gas supply passage configured to guide the combustion-supporting gas from the combustion-supporting gas supply to the calcination furnace;
   a calcination furnace exhaust-gas discharge passage, which is different from the kiln exhaust-gas discharge passage, configured to discharge a carbon dioxide gas-containing exhaust gas generated in the calcination furnace;
   a preheated raw-material supply passage configured to supply the preheated cement clinker raw material from the cyclone preheater to the calcination furnace;
   a first recovery collector, which is disposed in the calcination furnace exhaust-gas discharge passage, and is configured to recover a quicklime-containing raw material from the carbon dioxide gas-containing exhaust gas;
   a calcination furnace exhaust-gas supply passage, which is coupled to the calcination furnace exhaust-gas discharge passage at a position on a rear stream side of the first recovery collector in the calcination furnace exhaust-gas discharge passage, and is configured to merge a part of the carbon dioxide gas-containing exhaust gas flowing through the calcination furnace exhaust-gas discharge passage into the combustion-supporting gas flowing through the combustion-supporting gas supply passage;

a quicklime-containing raw material supply passage configured to supply the quicklime-containing raw material recovered by the first recovery collector from the first recovery collector to the cyclone heat exchanger coupled to the preheated raw-material supply passage or a cyclone heat exchanger located on a front stream side of the cyclone heat exchanger in the two or more cyclone heat exchangers;

a first decarbonated raw-material supply passage configured to supply the cement clinker raw material decarbonated in the calcination furnace from the calcination furnace to the rotary kiln;

a second decarbonated raw-material supply passage configured to supply a part of the decarbonated cement clinker raw material from the first decarbonated raw-material supply passage to a cyclone heat exchanger located on a rearmost stream side in the two or more cyclone heat exchangers;

a temperature measurement device configured to measure a temperature of the exhaust gas in the kiln exhaust-gas discharge passage when the exhaust gas passes through the cyclone heat exchanger coupled to the preheated raw-material supply passage; and a decarbonated raw-material supply amount controller configured to adjust an amount of the decarbonated cement clinker raw material to be supplied from the second decarbonated raw-material supply passage to the cyclone heat exchanger located on the rearmost stream side based on the temperature measured by the temperature measurement device and adjust a temperature in the cyclone heat exchanger coupled to the preheated raw-material supply passage through the adjustment of the amount of the decarbonated cement clinker raw material, wherein the combustion-supporting gas supply passage is for heat exchange between the carbon dioxide gas-containing exhaust gas flowing through the calcination furnace exhaust-gas discharge passage and the combustion-supporting gas at a position on a front stream side of the first recovery collector in the calcination furnace exhaust-gas discharge passage, and wherein the preheated raw-material supply passage is coupled to any one of second to subsequent cyclone heat exchangers from a rearmost stream side in the two or more cyclone heat exchangers of the cyclone preheater.

16. The cement clinker producing system according to claim 15, further comprising a water supply device configured to supply water or a water-containing waste to the exhaust gas flowing through the kiln exhaust-gas discharge passage when the exhaust gas passes through a part of the kiln exhaust-gas discharge passage, the part extending from a portion coupled to the rotary kiln to a portion on a front stream side of the cyclone heat exchanger located on the rearmost stream side.

17. The cement clinker producing system according to claim 15, further comprising a denitrating-agent supply device configured to supply a denitrating agent to the exhaust gas flowing through the kiln exhaust-gas discharge passage when the exhaust gas passes through a part of the kiln exhaust-gas discharge passage, the part extending from a portion coupled to the rotary kiln to a portion on the front stream side of the cyclone heat exchanger located on the rearmost stream side.

* * * * *